United States Patent
Fukuda et al.

(10) Patent No.: US 7,982,953 B2
(45) Date of Patent: Jul. 19, 2011

(54) ANTIREFLECTION FILM, AND POLARIZING PLATE AND IMAGE DISPLAY DEVICE USING THE SAME

(75) Inventors: Kenichi Fukuda, Minami-Ashigara (JP); Yasuhiro Okamoto, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 805 days.

(21) Appl. No.: 11/367,415

(22) Filed: Mar. 6, 2006

(65) Prior Publication Data

US 2006/0198021 A1 Sep. 7, 2006

(30) Foreign Application Priority Data

Mar. 7, 2005 (JP) ................. 2005-062874

(51) Int. Cl.
- *G02B 5/30* (2006.01)
- *G02B 1/11* (2006.01)
- *G02F 1/1335* (2006.01)
- *C09K 19/10* (2006.01)
- *C09K 21/02* (2006.01)

(52) U.S. Cl. ............. 359/487.01; 359/580; 359/601; 349/96; 349/137; 428/1.31; 428/1.5; 428/1.51; 428/447; 428/688; 427/372.2; 528/35

(58) Field of Classification Search .............. 359/580, 359/581, 601, 613, 614, 490, 487.01; 528/35; 349/96, 137; 427/372.2; 428/1.31, 1.5, 1.51, 428/409, 447, 688

See application file for complete search history.

(56) References Cited

U.S. PATENT DOCUMENTS

| | | | | |
|---|---|---|---|---|
| 5,919,555 A | * | 7/1999 | Yasuda et al. | 428/206 |
| 6,210,858 B1 | * | 4/2001 | Yasuda et al. | 430/270.1 |
| 6,383,559 B1 | * | 5/2002 | Nakamura et al. | 427/180 |
| 6,502,943 B2 | * | 1/2003 | Nakamura et al. | 359/603 |
| 6,777,102 B2 | * | 8/2004 | Sakurai et al. | 428/521 |
| 6,873,387 B2 | * | 3/2005 | Hokazono et al. | 349/137 |
| 6,908,647 B2 | * | 6/2005 | Obayashi et al. | 428/1.32 |
| 7,149,032 B2 | * | 12/2006 | Ohishi et al. | 359/586 |
| 7,270,883 B2 | * | 9/2007 | Kato | 428/421 |
| 7,371,439 B2 | * | 5/2008 | Matsunaga et al. | 428/1.3 |
| 2003/0004221 A1 | * | 1/2003 | Sakurai et al. | 522/15 |
| 2003/0187088 A1 | * | 10/2003 | Yoshikawa et al. | 522/172 |
| 2005/0038137 A1 | * | 2/2005 | Yoshihara et al. | 523/205 |

FOREIGN PATENT DOCUMENTS

JP  2001-188104 A  7/2001

(Continued)

OTHER PUBLICATIONS

Official Action, issued Sep. 14, 2010 in corresponding JP Application No. 2006-056661 with its English translation.

*Primary Examiner* — Ricky D Shafer
(74) *Attorney, Agent, or Firm* — Buchanan Ingersoll & Rooney PC

(57) ABSTRACT

An antireflection film comprising: a transparent plastic film substrate; a hard coat layer; and a low refractive layer, in this order, wherein the low refractive layer is formed by a curable composition comprising: (a) an inorganic fine particle; (b) at least one of a cationic polymerizable compound having a silyl group within the molecule; a hydrolysate of the compound; and a partial condensate of the compound; and (c) a photocationic polymerization initiator.

24 Claims, 2 Drawing Sheets

FOREIGN PATENT DOCUMENTS

| | | |
|---|---|---|
| JP | 2003-292831 A | 10/2003 |
| JP | 2004-42278 A | 2/2004 |
| JP | 2004-93947 A | 3/2004 |
| JP | 2004-170901 A | 6/2004 |
| JP | 2004-314468 A | 11/2004 |
| JP | 2005-23258 A | 1/2005 |
| JP | 2005-37739 A | 2/2005 |
| JP | 2005-53105 A | 3/2005 |

* cited by examiner

ANTIREFLECTION FILM, AND POLARIZING PLATE AND IMAGE DISPLAY DEVICE USING THE SAME

BACKGROUND OF THE INVENTION

1. Field of the Invention

The present invention relates to an antireflection film having a low refractive index layer formed of a specific curable composition, and a polarizing plate and an image display device each using the antireflection film. More specifically, the present invention relates to an antireflection film having a low refractive index layer formed of a curable composition comprising a cationic polymerizable compound having a silyl group within the molecular, an inorganic fine particle and a photopolymerization initiator, and a polarizing plate and an image display device each using the antireflection film.

2. Description of the Related Art

In various image display devices such as liquid crystal display device (LCD), plasma display panel (PDP), electroluminescence display (ELD) and cathode ray tube display device (CRT), an antireflection film is disposed on the display surface so as to prevent reduction in the contrast due to reflection of outside light or projection of an image. Accordingly, high transmittance and high physical strength (e.g., scratch resistance) are required of the antireflection film, in addition to high antireflection performance.

The antireflection layer used for the antireflection film has been heretofore provided by forming a single-layer or multilayer thin film. In the case of a single-layer film, a layer (low refractive index layer) having a refractive index lower than that of the substrate may be formed to a thickness of, in terms of the optical film thickness, ¼ the wavelength designed. When more reduction of reflectance is necessary, this may be attained by forming a layer (high refractive index layer) having a refractive index higher than that of the substrate between the substrate and the layer having a low refractive index.

As for the multilayer antireflection film, a multilayer film obtained by laminating transparent metal oxide thin films has been heretofore widely used. The transparent metal oxide thin film is usually formed by a chemical vapor deposition (CVD) process or a physical vapor deposition (PVD) process, particularly by a vacuum vapor deposition process which is a kind of physical vapor deposition process.

The multilayer antireflection film may be formed also by a wet coating process. This process is suitable for mass production and cost reduction as compared with the vacuum vapor deposition process and therefore, formation of an antireflection film by a roll-to-roll method according to the wet coating process is recently more predominating. Along with expanded demand for an antireflection film formed by the wet coating process, a method of producing an antireflection film at a lower cost is strongly demanded.

In the case of producing an antireflection film by the wet coating process, a coating composition prepared by dissolving or dispersing a film-forming composition having a specific refractive index in a solvent is coated on a substrate, then dried and if desired, cured.

As for the formation of a low refractive index layer, there are disclosed a large number of methods of curing a curable resin composition comprising a fluorine-containing compound or an inorganic material as a substance having a low refractive index (see, for example, JP-A-2001-188104 and JP-A-2003-292831).

In particular, for the formation of such a low refractive index layer, an ultraviolet curing method by thermal polymerization using a heat-curable composition or by radical polymerization using a composition comprising a (meth)acrylic resin having an unsaturated double bond is generally employed, and various heat-curable compositions or photoradical polymerizable compositions for the formation of a low refractive index have been developed.

However, in the case of continuously performing heat curing by a roll-to-roll method, a long heat-curing zone is necessary and this requires a large equipment investment for the production apparatus. Furthermore, in order to achieve more reduction of cost and depending on the purpose, elevate the processing speed, the heat-curing zone needs to be extended in proportion to the original length and the equipment investment required becomes larger.

On the other hand, in the case of using ultraviolet curing by radical polymerization, since the radical polymerization is susceptible to curing inhibition by oxygen, the ultraviolet irradiation needs to be performed with a low oxygen concentration. Therefore, in the step of continuously forming an ultraviolet cured resin by the roll-to-roll method, the ultraviolet curing must be performed in an atmosphere having a low oxygen concentration and this requires a special facility having an ultraviolet irradiation zone where the portion except for the film transporting part is sealed from the air. In turn, a large equipment investment becomes necessary.

Particularly, the low refractive layer is a thin film having a thickness of around 0.1 μm and due to its high surface area/volume ratio, this layer is very susceptible to curing inhibition by oxygen. The layer located below (on the support side) the low refractive layer is subjected to ultraviolet irradiation every time a layer is laminated thereon, so that even when curing inhibition by oxygen brings about some influence at the first lamination, curing can be effected at the time of laminating a new layer thereon. However, this effect cannot be expected to occur on the low refractive index layer located as the outermost layer. From these two reasons, oxygen must be more strictly excluded at the curing of the low refractive index layer than at the curing of other layers.

For obtaining a low oxygen concentration, a method of blowing a nitrogen gas into the ultraviolet irradiation zone sealed from the air and expelling oxygen in the zone (nitrogen purging) is employed. In order to form a low refractive index layer having sufficiently high scratch resistance without the effect of the curing inhibition, a large amount of nitrogen must be introduced into the ultraviolet irradiation zone and since a large amount of nitrogen gas needs to be consumed, there arise not only the problem of initial equipment investment but also the problem of running cost.

When the production rate is increased for the purpose of reducing the cost, the amount of oxygen flowed from the air into the ultraviolet irradiation zone along with the transportation of film increases and the oxygen flowed into the zone must be expelled by using a large amount of nitrogen. As a result, the consumption of a nitrogen gas per unit area is increased to greatly decrease the effect of reducing the cost by the elevation of the production rate.

In order to solve the problem of curing inhibition by oxygen in the radical polymerization, a method of forming the low refractive index layer from a cationic polymerizable composition insusceptible to curing inhibition by oxygen in the air may be considered.

A method of forming a low refractive index layer from a cationic polymerizable composition has been proposed (see, for example, JP-A-2004-093947, JP-A-2004-314468 and JP-A-2005-023258). However, the method disclosed in JP-A-2004-314468 is a method of laminating a low refractive index layer directly on a plastic plate by a dipping method, and the method disclosed in JP-A-2005-023258 is a method of laminating a low refractive index layer on a glass plate, where the application to an antireflection film having a hard coat layer as an underlying layer is not disclosed. Particularly, for obtaining an antireflection film having good surface physical properties such as scratch resistance, it is necessary to ensure good adhesion to the underlying layer, which is determined by the relationship with the underlying layer.

Also, in JP-A-2004-093947, a method for the application to an antireflection film having a four-layer structure including a hard coat layer is disclosed, but the application to a two-layer antireflection film which can be produced at a lower cost is not disclosed.

Along with the recent popularization of an antireflection film-mounted image display device such as liquid crystal television, a more inexpensive liquid crystal display device capable of enduring scratching in various environments is required on the market. Accordingly, it is demanded to develop an antireflection film having higher scratch resistance and being producible at a lower cost.

SUMMARY OF THE INVENTION

An object of the present invention is to provide an antireflection film having high antireflectivity and being assured of suitability for mass production and excellent scratch resistance.

Another object of the present invention is to provide a polarizing plate with antireflection ability, which has high antireflectivity and is assured of suitability for mass production and excellent scratch resistance.

Still another object of the present invention is to provide an image display device subjected to antireflection treatment, which has high antireflectivity and is assured of suitability for mass production and excellent scratch resistance.

As a result of intensive studies, the present inventors have found that when a low refractive index layer is formed on a transparent plastic film substrate with a hard coat layer by using a photocurable composition comprising an inorganic fine particle, a cationic polymerizable compound having a silyl group within the molecule and a photo-cationic polymerization initiator, an antireflection film having high antireflectivity and being assured of suitability for mass production and excellent scratch resistance can be produced.

That is, the above-described objects of the present invention can be attained by the following constitutions.

(1) An antireflection film comprising a transparent plastic film substrate, a hard coat layer laminated thereon directly or through another layer, and a low refractive layer laminated on the hard coat layer directly or through another layer, the low refractive layer being formed by a curable composition comprising the following (a) to (c):

(a) an inorganic fine particle, (b) at least one of: a cationic polymerizable compound having a silyl group within the molecule; a hydrolysate of the compound; and a partial condensate of the compound; and (c) a photo-cationic polymerization initiator.

(2) The antireflection film as claimed in claim 1, wherein the cationic polymerizable compound having a silyl group within the molecule is an organosilane represented by the following formula [A]:

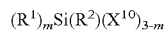
 Formula [A]

(wherein $R^{10}$ represents a substituted or unsubstituted alkyl group or a substituted or unsubstituted aryl group, $R^1$ represents a monovalent substituent having a cationic polymerizable functional group, $X^{10}$ represents a hydroxyl group or a hydrolyzable group, and m represents an integer of 0 to 2).

(3) The antireflection film as described in (1) or (2) above, wherein the inorganic fine particle (a) is a metal oxide fine particle.

(4) The antireflection film as described in (3) above, wherein the inorganic fine particle (a) is a silica fine particle.

(5) The antireflection film as described in (4) above, wherein a porous silica and/or a hollow silica occupies 50 mass % or more of all silica fine particles contained in the curable composition for forming the low refractive index layer.

(6) The antireflection film as described in any one of (3) to (5) above, wherein 50 mass % or more of silica fine particles contained in the curable composition for forming the low refractive index layer have an average particle diameter of 40 nm or more.

(7) The antireflection film as described in any one of (1) to (6) above, wherein at least a part of the inorganic fine particle (a) is surface-treated with an organosilane compound represented by formula [A].

(8) The antireflection film as described in any one of (1) to (7) above, wherein the inorganic fine particle content is from 5 to 70 mass % based on the entire solid content in the curable composition.

(9) The antireflection film as described in any one of (1) to (7) above, wherein the inorganic fine particle content is from 10 to 50 mass % based on the entire solid content in the curable composition.

(10) The antireflection film as described in any one of (1) to (7) above, wherein the inorganic fine particle content is from 20 to 40 mass % based on the entire solid content in the curable composition.

(11) The antireflection film as described in any one of (1) to (10) above, wherein the curable composition for forming the low refractive index layer further comprises (d) a polysiloxane compound having a cationic polymerizable functional group.

(12) The antireflection film as described in (11) above, wherein the polysiloxane compound (d) having a cationic polymerizable functional group is a polydimethylsiloxane compound.

(13) The antireflection film as described in (12) above, wherein the polydimethylsiloxane compound is a polydimethylsiloxane compound having a cationic polymerizable group at both terminals.

(14) The antireflection film as described in any one of (1) to (13) above, wherein the curable composition for forming the low refractive index layer comprises a fluorine compound.

(15) The antireflection film as described in any one of (1) to (13) above, wherein the curable composition for forming the low refractive index layer comprises a fluorine compound having a cationic polymerizable group within the molecule.

(16) The antireflection film as described in any one of (1) to (13) above, wherein the curable composition for forming the low refractive index layer comprises a fluorine polymer.

(17) The antireflection film as described in any one of (1) to (13) above, wherein the curable composition for forming the low refractive index layer comprises a fluorine polymer within the molecule.

(18) The antireflection film as described in any one of (1) to (13) above, wherein the curable composition for forming the low refractive index layer further comprises (e) a fluorine compound represented by the following formula [B]:

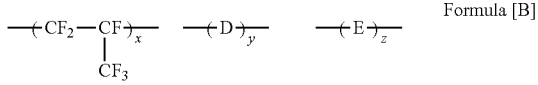

Formula [B]

(wherein x, y and z each represents a molar ratio, D represents a polymerization unit of a vinyl monomer having a cationic polymerizable group, and E represents a polymerization unit of an arbitrary vinyl monomer).

(19) The antireflection film as described in any one of (1) to (18) above, wherein the curable composition for forming the low refractive index layer further comprises (f) a compound containing neither a fluorine atom nor a silicon atom within the molecule and containing two or more cationic polymerizable groups.

(20) The antireflection film as described in any one of (1) to (19), wherein the ratio of the compound having a cationic polymerizable group to the binder component (excluding the inorganic fine particle) contained in the curable composition for forming the low refractive index is 70 mass % or more.

(21) The antireflection film as described in any one of (1) to (19), wherein the ratio of the compound having a cationic polymerizable group to the binder component (excluding the inorganic fine particle) contained in the curable composition for forming the low refractive index is 80 mass % or more.

(22) The antireflection film as described in any one of (1) to (19), wherein the ratio of the compound having a cationic polymerizable group to the binder component (excluding the inorganic fine particle) contained in the curable composition for forming the low refractive index is 90 mass % or more.

(23) The antireflection film as described in any one of (1) to (22) above, wherein the refractive index of the low refractive index layer is from 1.35 to 1.45.

(24) The antireflection film as described in any one of (1) to (23) above, wherein the low refractive index layer is formed directly on the hard coat layer, and the hard coat layer is a cured film formed of a curable composition comprising at least either an organosilane represented by the following formula [C] or a hydrolysate or partial condensate thereof:

Formula [C]:

(wherein $R^{10}$ represents a substituted or unsubstituted alkyl group or a substituted or unsubstituted aryl group, $X^{11}$ represents a hydroxyl group or a hydrolyzable group, and n represents an integer of 0 to 3).

(25) The antireflection film as described in any one of (1) to (24) above, wherein the low refractive index layer is formed directly on the hard coat layer, and the hard coat layer is a cured film formed of a curable composition containing a compound having a cationic polymerizable group.

(26) The antireflection film as described in any one of (1) to (25) above, wherein the low refractive index layer is cured by the ultraviolet irradiation under the conditions such that the oxygen concentration is 1 vol % or more.

(27) The antireflection film as described in (26) above, wherein the oxygen concentration is 3 vol % or more.

(28) The antireflection film as described in (26) above, wherein the oxygen concentration is 10 vol % or more.

(29) The antireflection film as described in (26) above, wherein the oxygen concentration is 18 vol % or more.

(30) The antireflection film as described in any one of (1) to (29) above, which has a low refractive index layer continuously laminated by the roll-to-roll system.

(31) The antireflection film as described in any one of (1) to (30) above, wherein the film transportation rate at the lamination of the low refractive index layer is 10 m/min or more.

(32) The antireflection film as described in any one of (1) to (30) above, wherein the film transportation rate at the lamination of the low refractive index layer is 20 m/min or more.

(33) The antireflection film as described in any one of (1) to (30) above, wherein the film transportation rate at the lamination of the low refractive index layer is 30 m/min or more.

(34) The antireflection film as described in any one of (1) to (33) above, wherein the low refractive index layer is laminated directly on the hard coat layer.

(35) The antireflection film as described in any one of (1) to (34) above, which has a constitution of "transparent support/hard coat layer/low refractive index layer".

(36) The antireflection film as described in any one of (1) to (35), wherein the hard coat layer is formed of a curable composition containing a cationic polymerizable composition.

(37) The antireflection film as described in (36) above, wherein the content of the cationic polymerizable compound in the curable composition for forming the hard coat layer is 5 mass % or more based on the entire binder.

(38) The antireflection film as described in (36) above, wherein the content of the cationic polymerizable compound in the curable composition for forming the hard coat layer is 10 mass % or more based on the entire binder.

(39) The antireflection film as described in (36) above, wherein the content of the cationic polymerizable compound in the curable composition for forming the hard coat layer is 20 mass % or more based on the entire binder.

(40) The antireflection film as described in any one of (1) to (39) above, wherein the thickness of the hard coat layer is from 1 to 10 μm.

(41) The antireflection film as described in any one of (1) to (39) above, wherein the thickness of the hard coat layer is from 1.2 to 6 μm.

(42) The antireflection film as described in any one of (1) to (41) above, which has irregularities on its surface and has an antiglare property.

(43) A polarizing plate comprising the antireflection film described in any one of (1) to (42) above for at least one protective film of a polarizing film.

(44) A polarizing plate comprising the antireflection film described in any one of (1) to (42) above for at least one protective film of a polarizing film and comprising an optical compensation film having an optically anisotropic property for another protective film of the polarizing film.

(45) An image display device comprising the antireflection film described in any one of (1) to (42) above or the polarizing plate described in (43) or (44) above on the image display surface.

(46) The image display device as described in (45) above, which is a TN-mode, STN-mode, IPS-mode, VA-mode or OCB-mode transmissive, reflective or transflective liquid crystal display device.

BRIEF DESCRIPTION OF THE DRAWINGS

1 denotes an antiglare antireflection film; 2 denotes a transparent support; 3 denotes an antiglare layer; 4 denotes a low refractive index layer; and 5 denotes a light-transparent fine particle

DETAILED DESCRIPTION OF THE INVENTION

The production method and the like of the antireflection film of the present invention are described below.

Incidentally, the term "from (numerical value 1) to (numerical value 2)" as used in the present invention for expressing a physical value, a characteristic value or the like means "(numerical value 1) or more and (numerical value 2) or less". Also, the term "(meth)acryloyl" as used in the present invention means "at least either acryloyl or methacryloyl". The same applies to "(meth)acrylate", "(meth)acrylic acid" and the like.

<Layer Construction>

In the antiglare antireflection film of the present invention, the following known layer constructions can be used.

Representative examples of the layer construction include:
  i: transparent support/antiglare layer,
  ii: transparent support/antiglare layer/low refractive index layer,
  iii: transparent support/hard coat layer/low refractive index layer,
  iv: transparent support/hard coat layer/medium refractive index layer/high refractive index layer/low refractive index layer, and
  v: low/high alternating multilayer.

Among these constructions, ii and iii are preferred from the standpoint that an object of the present invention is to provide an inexpensive antireflection film having high antireflectivity, and ii is more preferred in view of antireflectivity.

Examples of the layer which may be provided between the transparent support and a layer on the surface side include an antistatic layer (when the reduction of surface resistivity from the display side is required or when attachment of dusts to the surface or the like becomes a problem), a hard coat layer (when the hardness is insufficient only by the antiglare layer), a moisture-proof layer, an adhesion improving layer, and an interference fringe-preventing layer (when there is a difference in the refractive index between the transparent support and the antiglare or hard coat layer). Also, when an antiglare layer is used on a transparent support and the hardness is insufficient only by the antiglare layer, a hard coat layer may be provided between the transparent support and the antiglare layer.

The antistatic layer may be provided at a position other than between the transparent support and a layer thereon.

Figure 1:
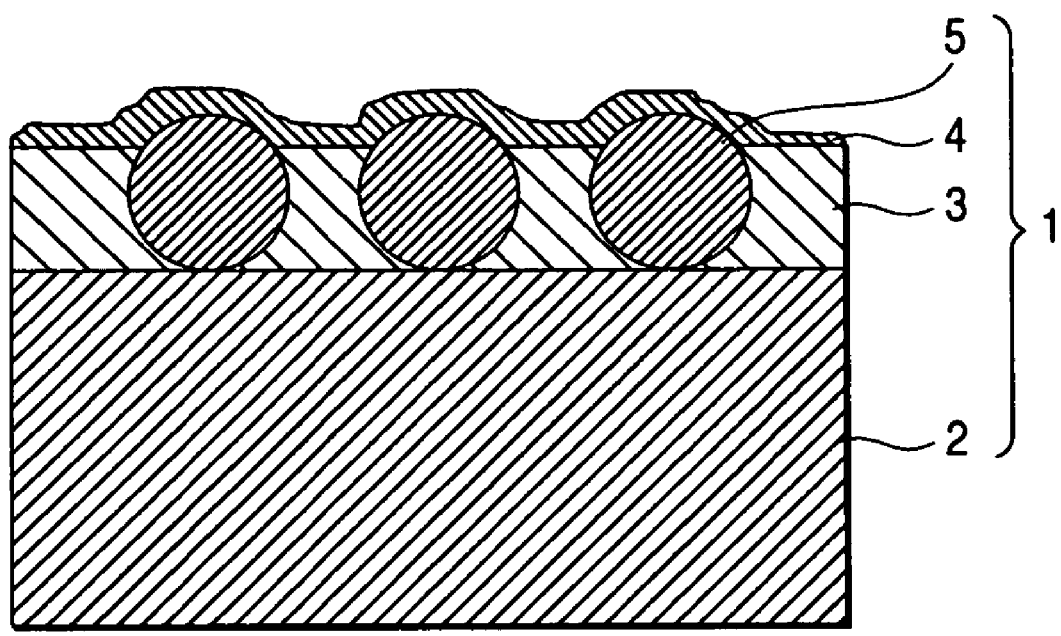
FIG. 1 is a schematic cross-sectional view showing a preferred embodiment of the antireflection film of the present invention.
Figure 2:
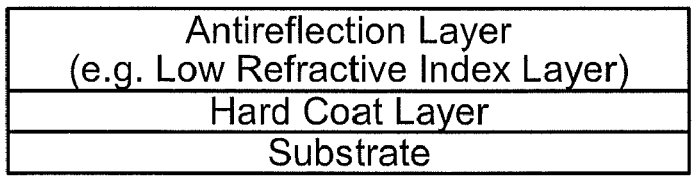
FIG. 2 is a schematic cross-sectional view of an antireflection film, according to an exemplary aspect.
Figure 3:
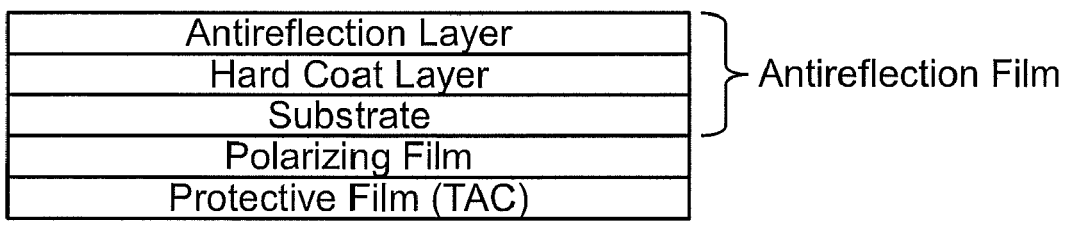
FIG. 3 is a schematic cross-sectional view of a polarizing plate, according to an exemplary aspect.
Figure 4:
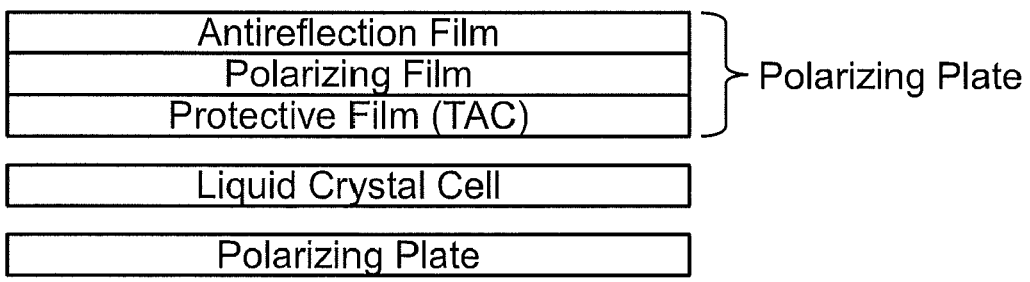
FIG. 4 is a schematic cross-sectional view of a liquid crystal display device, according to an exemplary aspect.

FIG. 1 is a cross-sectional view schematically showing one preferred embodiment of the antireflection film of the present invention.

The antiglare antireflection film 1 in this embodiment shown in FIG. 1 comprises a transparent support 2, an antiglare layer 3 formed on the transparent support 2, and a low refractive index layer 4 formed on the antiglare layer 3.

The antiglare layer 3 comprises a light-transparent resin and a light-transparent fine particle 5 dispersed in the light-transparent resin.

In the present invention, the refractive indexes of the layers constituting the antiglare antireflection film having an antireflection layer preferably satisfy the following relationship:

refractive index of antiglare layer>refractive index of transparent support>refractive index of low refractive index layer.

The antiglare layer having antiglare property preferably has both the antiglare property and the hard coat property. In this embodiment, the antiglare layer shown comprises one layer but may comprise a plurality of layers, for example, from 2 to 4 layers. Furthermore, the antiglare layer may be provided directly on the transparent support as in this embodiment but may also be provided through another layer such as antistatic layer or moisture-proof layer.

The low refractive index layer is described below.

<Low Refractive Index Layer>

In the antireflection film of the present invention, the refractive index of the low refractive index layer is from 1.30 to 1.55, preferably from 1.35 to 1.45.

If the refractive index is less than 1.30, the antireflection performance may be enhanced but the mechanical strength of the film decreases, whereas if it exceeds 1.55, the antireflection performance seriously deteriorates.

Furthermore, in view of reducing the reflectance, the low refractive index layer preferably satisfies the following mathematical formula (I):

$$(m_1/4) \times 0.7 < n_1 \times d_1 < (m_1/4) \times 1.3 \qquad \text{Mathematical formula (I)}$$

wherein $m_1$ is a positive odd number, $n_1$ is the refractive index of the low refractive index layer, $d_1$ is the film thickness (nm) of the low refractive index layer, and $\lambda$ is a wavelength and is a value in the range of 500 to 550 nm.

Incidentally, when mathematical formula (I) is satisfied, this means that $m_1$ (a positive odd number, usually 1) satisfying mathematical formula (I) is present within the above-described wavelength range.

The low refractive index layer includes, for example, a low refractive index layer formed by the crosslinking of a fluorine-containing resin capable of undergoing crosslinking by the effect of heat or ionizing radiation (hereinafter sometimes referred to as a "fluorine-containing resin before crosslinking") (embodiment 1), a low refractive index layer formed by a sol-gel method (embodiment 2), and a low refractive index layer using a particle and a binder polymer and having a void between particles or inside a particle (embodiment 3).

The low refractive index layer is, for example, a cured film formed by coating a curable composition mainly comprising a fluorine-containing polymer, and drying and curing the coating.

<Curable Composition>

The curable composition used for the low refractive index layer of the present invention comprises, as essential components, (a) an inorganic fine particle, (b) a cationic polymerizable compound having a silyl group within the molecule, and (c) a photo-cationic polymerization initiator.

The inorganic fine particle (a) is described below.

[Inorganic Fine Particle for Low Refractive Index Layer]

The blending amount of the inorganic fine particle is preferably from 1 to 100 mg/m$^2$, more preferably from 1 to 100 mg/m$^2$, still more preferably from 10 to 60 mg/m$^2$. If the blending amount is too small, the effect of improving the scratch resistance decreases, whereas if it is excessively large, fine irregularities are generated on the low refractive index layer surface and the appearance (e.g., real black) or the integrated reflectance may deteriorate. Therefore, the blending amount is preferably in the above-described range.

The inorganic fine particle is incorporated into the low refractive index layer and therefore, preferably has a low refractive index. Examples thereof include fine particles of magnesium fluoride and silica. Among these, a silica fine particle is preferred in view of refractive index, dispersion stability and cost.

The average particle diameter of the inorganic fine particle is preferably from 30 to 100%, more preferably from 35 to 80%, still more preferably from 40 to 60%, of the thickness of the low refractive index layer. In other words, when the thickness of the low refractive index layer is 100 nm, the average particle diameter of the silica fine particle is preferably from 30 to 100 nm, more preferably from 35 to 80 nm, still more preferably from 40 to 60 nm. When the particle diameter of the inorganic fine particle is more than the lower limit of this range, the effect of improving scratch resistance is remarkably brought out and this is preferred, and when it is more than the upper limit, a trouble that fine irregularities are generated on the low refractive index layer surface to cause, for example, deterioration of appearance (e.g., real black) or increase of integrated reflectance is advantageously prevented from occurrence.

The inorganic fine particle may be crystalline or amorphous and may be a monodisperse particle or may be even an aggregated particle as long as the predetermined particle diameter is satisfied. The shape is most preferably spherical but even if amorphous, there arises no problem.

The inorganic fine particle content is preferably from 5 to 70 mass %, more preferably from 10 to 50 mass %, still more preferably from 20 to 40 mass %, based on the entire solid content of the low refractive index layer.

The average particle diameter of the inorganic fine particle is measured by a Coulter counter.

In the curable composition for the formation of the low refractive index layer of the present invention, a "fine particle having a void" is preferably used so as to more reduce the increase in the refractive index of the low refractive index layer. The "fine particle having a void" has a fine void in the outside or inside and since an air is filled therein, the particle itself has a low refractive index. Accordingly, even when this particle is uniformly dispersed in a coating film, the refractive index of the coating film can be advantageously decreased. Preferred examples of the fine particle having a void include a porous silica fine particle and a hollow silica fine particle.

[Hollow Silica Fine Particle]

The hollow silica fine particle suitably used in the curable composition of the present invention is described below.

The refractive index of the hollow silica fine particle is preferably from 1.17 to 1.40, more preferably from 1.17 to 1.35, and most preferably from 1.17 to 1.30. The refractive index as used herein indicates a refractive index of the particle as a whole and does not indicate a refractive index of only the outer shell silica forming the hollow silica fine particle. At this time, assuming that the radius of the cavity inside the particle is $r_i$ and the radius of the outer shell of the particle is $r_o$, the porosity x represented by the following mathematical formula (1) is preferably from 10 to 60%, more preferably from 20 to 60%, and most preferably from 30 to 60%.

$$x=(r_i/r_o)^3\times100 \qquad \text{Mathematical formula (1)}$$

The average particle diameter of the hollow silica fine particle can be measured from an electron microphotograph.

If the hollow silica fine particle is rendered to have a lower refractive index so as to more increase the porosity, the thickness of the outer shell becomes small and the strength as a particle decreases. Therefore, in view of scratch resistance, the refractive index of the hollow silica fine particle is usually 1.17 or more.

Here, the refractive index of the hollow silica fine particle was measured by an Abbe refractometer {manufactured by ATAGO K.K.}.

The production method of the hollow silica fine particle is described, for example, in JP-A-2001-233611 and JP-A-2002-79616.

Also, at least one kind of an inorganic fine particle having an average particle diameter corresponding to less than 25% of the thickness of the low refractive index layer (this particle is referred to as a "small-size inorganic fine particle") may be used in combination with the inorganic fine particle having a particle diameter within the preferred range described above (this particle is referred to as a "large-size inorganic fine particle").

The small-size inorganic fine particle can be present in a gap between large-size inorganic fine particles and therefore, can contribute as a holding agent for the large-size inorganic fine particle.

When the thickness of the low refractive index layer is 100 nm, the average particle diameter of the small-size inorganic fine particle is preferably from 1 to 20 nm, more preferably from 5 to 15 nm, still more preferably from 10 to 15 nm. Use of such an inorganic fine particle is preferred in view of the raw material cost and the holding agent effect.

As for this inorganic fine particle, an inorganic fine particle having an average particle diameter corresponding to 30 to 100% of the thickness of the low refractive index layer, having a hollow structure and having a refractive index of 1.17 to 1.40 is preferably used.

The inorganic fine particle may be subjected to a physical surface treatment such as plasma discharge treatment and corona discharge treatment, or a chemical surface treatment with a surfactant, a coupling agent or the like, so as to stabilize the dispersion in a liquid dispersion or a coating solution or to enhance the affinity for or the binding property with a binder component. Use of a coupling agent is particularly preferred. As for the coupling agent, an alkoxy metal compound (e.g., titanium coupling agent, silane coupling agent) is preferably used. Among these treatments, a silane coupling treatment is preferred.

The coupling agent is used as a surface treating agent for previously applying a surface treatment to the inorganic fine particle of the low refractive index layer before the coating solution for the layer is prepared, but the coupling agent is preferably further added as an additive at the preparation of the coating solution for the low refractive index layer and incorporated into the layer.

The inorganic fine particle is preferably dispersed in a medium in advance of the surface treatment so as to reduce the load of the surface treatment.

The organosilane compound (b) is described below.

<Organosilane Compound for Low Refractive Index Layer>

For the purpose of improving the scratch resistance of the antireflection film, the curable composition of the present invention contains a hydrolysate and/or a partial condensate of an organosilane compound (hereinafter, the obtained reaction solution is sometimes referred to as a "sol component"). By virtue of this constitution, both the antireflection ability and the scratch resistance can be satisfied.

Also, at least either an organosilane compound or a hydrolysate or partial condensate thereof as the component (b) of the present invention may be previously used as a surface treating agent for the inorganic fine particle as the component (a) contained in the low refractive index layer before preparing the coating solution for the low refractive index layer. This sol component may also be added as an additive at the preparation of the coating solution or may be added twice for both purposes as a surface treating agent and as an additive.

This sol component forms a cured product by undergoing condensation during drying and heating after the coating of the curable composition and functions as a binder of the low refractive index layer. Furthermore, in the present invention, when a fluorine-containing polymer described later is contained, a binder having a three-dimensional structure is formed by the irradiation of actinic rays.

The organosilane compound is preferably an organosilane compound represented by the following formula [A]:

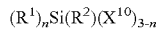
$(R^1)_n Si(R^2)(X^{10})_{3-n}$          Formula [A]:

In formula [A], $R^1$ represents a substituted or unsubstituted alkyl group or a substituted or unsubstituted aryl group. Examples of the alkyl group include methyl, ethyl, propyl, isopropyl, hexyl, hexyl, decyl and hexadecyl. The alkyl group is preferably an alkyl group having a carbon number of 1 to 30, more preferably from 1 to 16, still more preferably from 1 to 6. Examples of the aryl group include phenyl and naphthyl, with a phenyl group being preferred.

In formula [A], $R^2$ represents a monovalent substituent having a cationic polymerizable functional group. Examples of the cationic polymerizable group include an epoxy group, an oxetane group and an oxazolyl group.

$X^{10}$ represents a hydroxyl group or a hydrolyzable group, and examples thereof include an alkoxy group (preferably an alkoxy group having a carbon number of 1 to 5, such as methoxy group and ethoxy group), a halogen atom (e.g., Cl, Br, I) and a group represented by $R^{12}COO$ (wherein $R^{12}$ is preferably a hydrogen atom or an alkyl group having a carbon number of 1 to 5, such as $CH_3COO$ and $C_2H_5COO$). Among these, an alkoxy group is preferred, and a methoxy group and an ethoxy group are more preferred.

a represents an integer of 0 to 2, preferably 0 or 1, more preferably 0.

When a plurality of $R^1$'s or $X^{10}$'s are present, the plurality of $R^1$'s or $X^{10}$'s may be the same or different.

The substituent contained in $R^1$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted. When a plurality of $R^{10}$'s are present, at least one $R^{10}$ is preferably a substituted alkyl group or a substituted aryl group.

Examples of this compound include (M-28) to (M-38).

Among these specific examples, (M-30) and (M-35) are preferred.

In the present invention, the amount used of the organosilane compound represented by formula [A] is not particularly limited but is preferably from 1 to 300 mass %, more preferably from 3 to 100 mass %, and most preferably from 5 to 50 mass %, based on the inorganic fine particle, and is preferably from 1 to 300 mol %, more preferably from 5 to 300 mol %, and most preferably from 10 to 200 mol %, based on the hydroxyl group on the surface of the inorganic fine particle. When the amount used of the organosilane compound is in this range, a satisfactory effect of stabilizing the liquid dispersion is obtained and the film strength at the formation of a coating film is sufficiently high.

[Improvement of Dispersibility of Inorganic Fine Particle]

In the present invention, the hydrolysate and/or partial condensate of the organosilane compound is preferably caused to act with the inorganic fine particle surface so as to improve the dispersibility of the inorganic fine particle. Specifically, a component originated in the organosilane compound is bonded to the surface of the inorganic fine particle as a result of a hydrolysis/condensation reaction of the organosilane compound. The hydrolysis/condensation reaction of the organosilane compound is preferably performed with stirring at 15 to 100° C. in the presence of an acid catalyst or metal chelate compound usable in the present invention by adding water in an amount of usually from 0 to 2.0 mol per mol of the hydrolyzable group ($X^{10}$).

[Acid Catalyst, Metal Chelate Compound]

The sol component, that is, the hydrolysate or condensation reaction product of the organosilane compound or a mixture thereof, is preferably prepared in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; and metal alkoxides such as triisopropoxyaluminum and tetrabutoxyzirconium. In view of production stability or storage stability of the inorganic fine particle solution, at least either an acid catalyst (inorganic acids, organic acids) or a metal chelate compound is used in the present invention. As for the inorganic acid, a hydrochloric acid and a sulfuric acid are preferred, and as for the organic acid, an organic acid having an acid dissociation constant {pKa value (25° C.)} of 4.5 or less in water is preferred. In particular, a hydrochloric acid, a sulfuric acid and an organic acid having an acid dissociation constant of 3.0 or less in water are preferred, a hydrochloric acid, a sulfuric acid and an organic acid having an acid dissociation constant of 2.5 or less in water are more preferred, and an organic acid having an acid dissociation constant of 2.5 or less in water is still more preferred. Among these, a methanesulfonic acid, an oxalic acid, a phthalic acid and a malonic acid are more preferred, and an oxalic acid is still more preferred.

In the case where the hydrolyzable group of the organosilane is an alkoxy group and the acid catalyst is an organic acid, since the carboxyl group or sulfo group of the organic acid supplies a proton, the amount of water added can be reduced. The amount of water added is from 0 to 2 mol, preferably from 0 to 1.5 mol, more preferably from 0 to 1 mol, still more preferably from 0 to 0.5 mol, per mol of the alkoxide group of the organosilane. In the case of using an alcohol as the solvent, addition of substantially no water is also preferred.

In the case where the acid catalyst is an inorganic acid, the amount of the acid catalyst used is from 0.01 to 10 mol %, preferably from 0.1 to 5 mol %, based on the hydrolyzable group. In the case where the acid catalyst is an organic acid, the optimum amount of the catalyst used varies depending on the amount of water added, but when water is added, the amount of the catalyst used is from 0.01 to 10 mol %, preferably from 0.1 to 5 mol %, based on the hydrolyzable group, and when water is not substantially added, the amount of the catalyst used is from 1 to 500 mol %, preferably from 10 to 200 mol %, more preferably from 20 to 200 mol %, still more preferably from 50 to 150 mol %, yet still more preferably from 50 to 120 mol %, based on the hydrolyzable group.

The treatment is performed with stirring at 15 to 100° C., but the conditions are preferably adjusted depending on the reactivity of organosilane.

(Metal Chelate Compound)

As for the metal chelate compound, any metal chelate compound may be suitably used without particular limitation as long as an alcohol represented by the following formula (2-1) and/or a compound represented by the following formula (2-2) is present as a ligand and the center metal is a metal selected from Zr, Ti and Al. Within this scope, two or more kinds of metal chelate compounds may be used in combination.

$$R^{21}OH \qquad \text{Formula (2-1):}$$

$$R^{22}COCH_2COR^{23} \qquad \text{Formula (2-2):}$$

(wherein $R^{21}$ and $R^{22}$, which may be the same or different, each represents an alkyl group having a carbon number of 1 to 10, and $R^{23}$ represents an alkyl group having a carbon number of 1 to 10 or an alkoxy group having a carbon number of 1 to 10).

The metal chelate compound suitably used in the present invention is preferably selected from the group consisting of compounds represented by the following formulae:

$$Zr(OR^{21})_{c1}(R^{22}COCHCOR^{23})_{c2},$$

$$Ti(OR^{21})_{d1}(R^{22}COCHCOR^{23})_{d2}, \text{ and}$$

$$Al(OR^{21})_{e1}(R^{22}COCHCOR^{23})_{e2}.$$

Such a compound acts to accelerate a condensation reaction of the organosilane compound.

In the metal chelate compounds, $R^{21}$ and $R^{22}$, which may be the same or different, each represents an alkyl group having a carbon number of 1 to 10 such as ethyl group, n-propyl group, i-propyl group, n-butyl group, sec-butyl group, tert-butyl group, n-pentyl group and phenyl group, and $R^{23}$ represents an alkyl group having a carbon number of 1 to 10 similarly to the above or an alkoxy group having a carbon number of 1 to 10 such as methoxy group, ethoxy group, n-propoxy group, i-propoxy group, n-butoxy group, sec-butoxy group and tert-butoxy group. Also, in the metal chelate compounds, c1, c2, d1, d2, e1 and e2 each represents an integer determined to give a tetradentate or hexadentate coordination.

Specific examples of these metal chelate compounds include a zirconium chelate compound such as tri-n-butoxyethylacetoacetate zirconium, di-n-butoxy-bis(ethylacetoacetate) zirconium, n-butoxy-tris(ethylacetoacetate) zirconium, tetrakis(n-propylacetoacetate) zirconium, tetrakis (acetylacetoacetate) zirconium and tetrakis (ethylacetoacetate) zirconium; a titanium chelate compound such as diisopropoxy-bis(ethylacetoacetate) titanium, diisopropoxy-bis(acetylacetate) titanium and diisopropoxy-bis (acetylacetone) titanium; and an aluminum chelate compound such as diisopropoxyethylacetoacetate aluminum, diisopropoxyacetylacetonato aluminum, isopropoxy-bis (ethylacetoacetate) aluminum, isopropoxy-bis(acetylacetonate) aluminum, tris(ethylacetoacetate) aluminum, tris (acetylacetonate) aluminum and monoacetylacetonato-bis (ethylacetoacetate) aluminum.

Among these metal chelate compounds, preferred are tri-n-butoxyethylacetoacetate zirconium, diisopropoxy-bis (acetylacetonate) titanium, diisopropoxyethylacetoacetate aluminum and tris(ethylacetoacetate) aluminum. One of these metal chelate compounds may be used alone, or two or more thereof may be used as a mixture. Also, a partial hydrolysate of such a metal chelate compound can be used.

In view of the condensation reaction rate and the film strength when a coating film is formed, the metal chelate compound is preferably used at a proportion of 0.01 to 50 mass %, more preferably from 0.1 to 50 mass %, still more preferably from 0.5 to 10 mass %, based on the organosilane compound.

[Solvent for Dispersibility Improving Treatment]

The dispersibility improving treatment by at least either one component of a hydrolysate and a partial condensate of the organosilane compound may be performed with or without a solvent, but in the case of using a solvent, the concentration of the hydrolysate or partial condensate of the organosilane compound can be appropriately determined. As for the solvent, an organic solvent is preferably used so as to uniformly mix the component. Suitable examples thereof include alcohols, aromatic hydrocarbons, ethers, ketones and esters.

The solvent is preferably a solvent capable of dissolving a hydrolysate or partial condensate of the organosilane compound and a catalyst. In view of the process, the solvent is preferably used as it is as a solvent of the curable composition for layer formation or as a part of the solvent of the curable composition, and a solvent of not impairing the solubility or dispersibility when mixed with other materials such as fluorine-containing polymer, is preferred.

Out of these organic solvents, examples of the alcohols include a monohydric alcohol and a dihydric alcohol. The monohydric alcohol is preferably a saturated aliphatic alcohol having a carbon number of 1 to 8. Specific examples of such alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene glycol monoethyl ether acetate.

Specific examples of the aromatic hydrocarbons include benzene, toluene and xylene. Specific examples of the ethers include tetrahydrofuran and dioxane. Specific examples of the ketones include acetone, methyl ethyl ketone, methyl isobutyl ketone and diisobutyl ketone. Specific examples of the esters include ethyl acetate, propyl acetate, butyl acetate and propylene carbonate.

One of these organic solvents may be used alone, or two or more thereof may be used in combination.

The concentration of the organosilane compound in the dispersibility improving treatment is not particularly limited but is usually from 0.1 to 70 mass %, preferably from 1 to 50 mass %, based on the solvent.

In the present invention, subsequent to the dispersibility improving treatment performed after dispersing the inorganic fine particle by using an alcohol-based solvent, the dispersion solvent is preferably displaced by an aromatic hydrocarbon solvent or a ketone-based solvent. From the standpoint of increasing the affinity for a binder used in combination at the coating or enhancing the stability of the dispersion itself, displacement by a ketone-based solvent is preferred.

[Catalyst in Dispersibility Improving Treatment]

The dispersibility improving treatment by at least either one component of a hydrolysate and a partial condensate of the organosilane compound is preferably performed in the presence of a catalyst. As for the catalyst, those described above in the item of (Acid Catalyst, Metal Chelate Compound) can be preferably used.

[Additive for Stabilizing Curable Composition]

In addition to those organosilane compound, acid catalyst and chelate compound, the curable composition for layer formation used in the present invention preferably contains a β-diketone compound and/or a β-ketoester compound, represented by the following formula (3). Such a compound acts as a stability enhancer of the curable composition for layer formation used in the present invention.

 Formula (3):

More specifically, the compound represented by formula (3) is considered to coordinate to a metal atom in the metal chelate compound (zirconium, titanium and/or aluminum compound) and thereby act to suppress the action of the metal chelate compound of accelerating the condensation reaction of the organosilane with the metal chelate component and enhance the storage stability of the composition obtained. In the compound represented by formula (3), $R^{31}$ and $R^{32}$ are the same as $R^{22}$ and $R^{23}$ constituting the metal chelate compound.

Specific examples of the β-diketone compound and the β-ketoester compound, represented by formula (3), include acetylacetone, methyl acetoacetate, ethyl acetoacetate, n-propyl acetoacetate, i-propyl acetoacetate, n-butyl acetoacetate, sec-butyl acetoacetate, tert-butyl acetoacetate, 2,4-hexanedione, 2,4-heptanedione, 3,5-heptanedione, 2,4-octanedione, 2,4-nonanedione and 5-methylhexanedione. Among these, ethyl acetoacetate and acetylacetone are preferred, and acetylacetone is more preferred.

One of these β-diketone compounds and β-ketoester compounds may be used alone or two or more thereof may be used as a mixture.

In the present invention, the β-diketone compound and the β-ketoester compound each is preferably used in an amount of 2 mol or more, more preferably from 3 to 20 mol, per mol of the metal chelate compound. When the amount added is 2 mol or more, the composition obtained is free from fear of poor storage stability and this is preferred.

The photopolymerization initiator (c) is described below.
<Photopolymerization Initiator for Low Refractive Index Layer>

The acid generator of generating a cation by the action of an ultraviolet ray includes an ionic curable resin such as triarylsulfonium salt, diaryliodonium salt, monoaryldialkylsulfonium salt, triarylselenonium salt, tetraarylphosphonium salt and aryldiazonium salt, a nonionic curable resin such as nitrobenzyl ester of sulfonic acid, and an active halogen. Known various acid generators such as curable resins described, for example, in Organic Material Electronics (OME) (compiler), *Imaging yo Yuki Zairyo* (*Organic Materials for Imaging*), Bunshin Shuppan (1997), may be used. Among these compounds, in particular, a triarylsulfonium salt is preferred, and the counter ion is preferably, for example, $PF_6^-$, $SbF_6^-$, $AsF_6^-$, $(C_6F_5)_4B^-$, $BF_4^-$, $HSO_4^-$ or $ClO_4^-$, Also, use of a triarylsulfonium salt and a diaryl iodonium salt in combination is preferred. Further, an active halogen can be preferably used.

The photoacid generators of iodonium salt type are described, for example, in Organic Material Electronics (OME) (compiler), *Imaging yo Yuki Zairyo* (*Organic Materials for Imaging*), Bunshin Shuppan (1997) and JP-A-11-322900. The photoacid generator for use in the present invention is preferably represented by the following formula (1'):

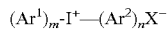 Formula (1'):

In the formula, $Ar^1$ and $Ar^2$ each represents an aromatic hydrocarbon group or an aromatic heterocyclic group, and $Ar^1$ and $Ar^2$ may combine to form a ring. Examples of the aromatic hydrocarbon group include phenyl, 1-naphthyl and 2-naphthyl. Examples of the aromatic heterocyclic group include 2-thienyl, 3-thienyl, 2-furyl, 3-furyl, 2-pyrrolyl, 3-pyrrolyl and 2-thiazolyl. $Ar^1$ and $Ar^2$ each is preferably an aromatic hydrocarbon group, more preferably a phenyl group. Such a group may further have a substituent. The substituent is not particularly limited, but a substituent having basicity such as amino group neutralizes the acid generated and is not preferred. Specific examples of the substituent include an alkyl group (e.g., methyl, ethyl, isopropyl, tert-butyl, tert-amyl, 2-ethylhexyl, dodecyl), a cycloalkyl group (e.g., cyclohexyl, cyclopentyl), an aryl group (e.g., phenyl, 2-naphthyl), an alkenyl group (e.g., vinyl), an alkoxy group (e.g., methoxy, ethoxy, isopropoxy, octyloxy, cyclohexyloxy), an aryloxy group (e.g., phenoxy), a halogen (e.g., fluorine, chlorine, bromine, iodine), an alkoxycarbonyl group (e.g., ethoxycarbonyl, butoxycarbonyl), an aryloxycarbonyl group (e.g., phenoxycarbonyl), an acyloxy group (e.g., acetoxy, benzoyloxy), a carbamoyl group, an acylamino group, a cyano group, a hydroxyl group, a carboxyl group and a heterocyclic group (e.g., 2-thienyl, 3-thienyl, 2-furyl, 2-pyrrolyl, oxylanyl, oxetanyl). These substituents each may be further substituted.

m and n each represents 1 or 2, preferably 1. Also, when a plurality of $Ar^1$'s or $Ar^2$'s are present, m and n may be the same or different. $X^-$ is a counter anion of the iodonium salt and is preferably a conjugate base of a strong acid. Examples of $X^-$ include $PF_6^-$, $BF_4^-$, $HSO_4^-$, $ClO_4^-$, $AsF_6^-$, $SbF_6^-$, $CF_3SO_3^-$, $CH_3\text{—}C_6H_4\text{—}SO_3^-$, $(C_6F_5)_4B^-$, $Cl^-$ and $Br^-$. Among these, $PF_6^-$, $BF_4^-$ and $CF_3SO_3^-$ are preferred, and $PF_6^-$ is particularly preferred.

Specific examples of the photoacid generator of iodonium salt type include Compounds (1) to (28) described in [0078] to [0081] of JP-A-2003-268141 and "RHODORSILPHOTO-INITIATOR 2074" available from Rhodia Japan Co. Ltd., but the present invention is not limited thereto.

The photoacid generator of triarylsulfonium salt type is represented by the following formula (1"):

In the formula, R represents an aryl group or an alkyl group having 1 to 20 carbon atoms; when a plurality of R are present in one molecule, they may be the same or different; $X^-$ is a counter anion as described above and is preferably a conjugate base of a strong acid.

Specific examples of the photoacid generator of triarylsulfonium salt type include compounds described in JP-A-11-322900, "CYPACURE UVI-6990" and "CYRACURE UVI-6974" commercially available from Dow Chemical Japan Co., Ltd., and Adekaoptomer SP-150, and SP-170 commercially available from Asahi Denka Kogyo Co., Ltd. However, the present invention is not limited thereto.

As the active halogen, specifically mention may be made of compounds described in Wakabayashi et al. "Bull Chem. Soc Japan" vol. 42, page 2974 (1969), U.S. Pat. No. 3,905,815, JP-A-5-27830, and M. P. Hutt "Jounal of Heterocyclic Chemistry" vol. 1, item 3 (1970). Particularly, oxazole compounds with which a trihalomethyl group is substituted and s-triazine compounds can be mentioned. More preferably, an s-triazine derivative wherein at least one mono, di or tri-halogen-substituted methyl group(s) is/are bonded to the s-triazine ring can be mentioned. As the specific example, are known an s-triazine and an oxathiazole including 2-(p-methoxyphenyl)-4,6-bis(trichloromethyl)-s-triazine, 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate)aminophenyl)-4,6-bis(trichloromethyl)-s-triazine, 2-trihalomethyl-5-(p-methoxyphenyl)-1,3,4-oxadiazole, and 2-{4-(4-hydroxybenzoylamino)phenyl}-4,6-bis(trichloromethyl)-s-triazine. Specifically, are particularly preferred compounds described in pp 14 to 30 of JP-A-58-15503, pp 6 to 10 of JP-A-55-77742, compounds Nos. 1 to 8 described in p 287 of JP-B-60-27673, compounds Nos. 1 to 17 described in pp 443 to 444 of JP-A-60-239736, and compounds Nos. 1 to 19 described in U.S. Pat. No. 4,701,399.

[Other Materials Contained in Curable Composition for Low Refractive Index Layer]

The materials forming the low refractive index layer are described below.

In the low refractive index layer, a monomer or polymer capable of crosslinking by the effect of heat or ionizing radiation may be further incorporated as the binder. Out of the binder components (excluding the inorganic fine particle) contained in the low refractive index layer, the proportion of the compound having a cationic polymerizable group is preferably 70 mass % or more, more preferably 80 mass % or more, still more preferably 90 mass % or more. When the proportion of the compound having a cationic polymerizable group is 70 mass % or more, a strong film can be obtained even by the curing in an atmosphere elevated in the oxygen concentration.

The monomer or polymer capable of crosslinking by the effect of heat or ionizing radiation, which is used in the low refractive index layer, is not particularly limited. The monomer is preferably a ionizing radiation-curable polyfunctional monomer, similarly to the high (medium) refractive index layer which is described later. The polymer is preferably a crosslinking fluorine-containing compound as represented by the above-described compound, but other examples of the polymer include a perfluoroalkyl group-containing silane compound such as compounds set forth later, and a fluorine-containing copolymer of a fluorine-containing monomer and a monomer for imparting a crosslinking group. Specific examples of the fluorine-containing monomer include fluoroolefins (e.g., fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid [for example, "BISCOTE 6FM" {produced by Osaka Organic Chemical Industry Ltd.} and "M-2020" {produced by Daikin Industries, Ltd.}], and completely or partially fluorinated vinyl ethers. Examples of the monomer for imparting a crosslinking group include a (meth)acrylate monomer previously having a crosslinking functional group within the molecule, such as glycidyl methacrylate, and a (meth)acrylate monomer having a carboxyl group, a hydroxyl group, an amino group, a sulfonic acid group or the like {for example, a (meth)acrylic acid, a methylol (meth)acrylate, a hydroxyalkyl (meth)acrylate and an allyl acrylate}. In the latter case, a crosslinked structure can be introduced after copolymerization and this is described in JP-A-10-25388 and JP-A-10-147739.

Not only a copolymer of the fluorine-containing monomer and the monomer for imparting a crosslinking group but also a copolymer where a monomer other than these monomers is copolymerized may be used. The monomer which can be used in combination is not particularly limited, and examples thereof include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinylbenzene, vinyltoluene, δ-methylstyrene), vinyl ethers (e.g., methyl vinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile derivatives. Examples of the binder which can be preferably used in the low refractive index layer include the copolymers described in [0030] to [0047] of JP-A-2004-45462.

<Fluorine-Containing Polymer for Low Refractive Index Layer>

The fluorine-containing polymer is preferably a polymer capable of giving, when cured, a film having a dynamic friction coefficient of 0.03 to 0.20, a contact angle with water of 90 to 120° and a pure water sliding angle of 70° or less, and undergoing crosslinking by the effect of heat or ionizing radiation, because the productivity is enhanced, for example, in the case of coating and curing the coating solution on a roll film while the film is transported as a web.

Also, in the case of applying the antireflection film of the present invention to an image display device, as the peel force with a commercially available adhesive tape is lower, a seal or a memo attached can be more easily peeled off. Therefore, the peel force is preferably 500 gf or less, more preferably 300 gf or less, and most preferably 100 gf of less. Furthermore, as the surface hardness measured by a microhardness tester is higher, the antireflection film is less scratched. Therefore, the surface hardness is preferably 0.3 GPa or more, more preferably 0.5 GPa or more.

The fluorine-containing polymer for use in the low refractive index layer is a fluorine-containing polymer having a fluorine atom content of 35 to 80 mass % and containing a crosslinking or polymerizable functional group, and examples thereof include not only a hydrolysate or dehydration-condensate of a perfluoroalkyl group-containing silane compound [for example, (heptadecafluoro-1,1,2,2-tetrahydrodecyl)triethoxysilane] but also a fluorine-containing copolymer having a fluorine-containing monomer unit and a crosslinking reactive unit as the constituent units. In the case of a fluorine-containing copolymer, the main chain preferably comprises only a carbon atom. In other words, an oxygen atom, a nitrogen atom or the like is preferably not present in the main chain skeleton.

Specific examples of the fluorine-containing monomer unit include fluoroolefins (e.g., fluoroethylene, vinylidene fluoride, tetrafluoroethylene, perfluorooctyl ethylene, hexafluoropropylene, perfluoro-2,2-dimethyl-1,3-dioxol), partially or completely fluorinated alkyl ester derivatives of (meth)acrylic acid (e.g., BISCOTE 6FM (produced by Osaka Organic Chemical Industry Ltd.), M-2020 (produced by Daikin Industries, Ltd.)), and completely or partially fluorinated vinyl ethers. Among these, perfluoroolefins are preferred and in view of refractive index, solubility, transparency and easy availability, hexafluoropropylene is more preferred.

Examples of the crosslinking reactive unit include a constituent unit obtained by the polymerization of a monomer previously having a self-crosslinking functional group within the molecule, such as glycidyl (meth)acrylate and glycidyl vinyl ether; and a constituent unit resulting from introduction of a crosslinking reactive group such as (meth)acryloyl group by a polymer reaction (the crosslinking reactive group can be introduced, for example, by causing an acrylic acid chloride to act on a hydroxy group) into a constituent unit obtained by the polymerization of a monomer having a carboxyl group, a hydroxy group, an amino group, a sulfo group or the like [for example, a (meth)acrylic acid, a methylol (meth)acrylate, a hydroxyalkyl (meth)acrylate, an allyl acrylate, a hydroxyethyl vinyl ether, a hydroxybutyl vinyl ether, a maleic acid and a crotonic acid].

In addition to those fluorine-containing monomer unit and crosslinking reactive unit, in view of solubility in solvent, transparency of film or the like, a monomer not containing a fluorine atom may also be appropriately copolymerized to introduce another polymerization unit. The monomer unit which can be used in combination is not particularly limited, and examples thereof include olefins [e.g., ethylene, propylene, isoprene, vinyl chloride, vinylidene chloride], acrylic acid esters [e.g., methyl acrylate, methyl acrylate, ethyl acrylate, 2-ethylhexyl acrylate], methacrylic acid esters [e.g., methyl methacrylate, ethyl methacrylate, butyl methacrylate, ethylene glycol dimethacrylate], styrene derivatives [e.g., styrene, divinylbenzene, vinyltoluene, (α-methylstyrene], vinyl ethers [e.g., methyl vinyl ether, ethyl vinyl ether, cyclohexyl vinyl ether], vinyl esters [e.g., vinyl acetate, vinyl propionate, vinyl cinnamate], acrylamides [e.g., N-tert-butylacrylamide, N-cyclohexylacrylamide], methacrylamides and acrylonitrile derivatives.

With this fluorine-containing polymer, a curing agent may be appropriately used in combination as described in JP-A-10-25388 and JP-A-10-147739.

The fluorine-containing polymer particularly useful in the present invention is a random copolymer of a perfluoroolefin and a vinyl ether or ester. In particular, the fluorine-containing polymer preferably has a group capable of undergoing a crosslinking reaction by itself [for example, a radical reactive group such as (meth)acryloyl group, and a ring-opening polymerizable group such as epoxy group and oxetanyl group].

The crosslinking reactive group-containing polymerization unit preferably occupies from 5 to 70 mol %, more preferably from 30 to 60 mol %, in all polymerization units of the polymer.

The preferred embodiment of the fluorine-containing polymer for use in the low refractive index layer of the present invention includes a compound represented by formula 1:

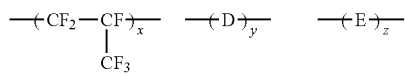

(wherein x, y and z each represents a molar ratio, D represents a polymerization unit of a vinyl monomer having a cationic polymerizable group, and E represents a polymerization unit of an arbitrary vinyl monomer).

(Other Cationic Polymerizable Compounds)

The composition for the formation of the low refractive index layer of the present invention may also contain a curing agent containing neither fluorine nor silicon and containing a cationic polymerizable group. Examples of the cationic polymerizable group include an epoxy group, an oxetanyl group, an oxazolyl group and a vinyloxy group. The cationic polymerizable group is preferably a ring-opening polymerizable group, more preferably an epoxy group or an oxetanyl group, still more preferably an epoxy group. These groups each may have a substituent at the position to which the substituent can be substituted.

A plurality of cationic polymerizable groups are preferably introduced per molecule of the curing agent. The number of cationic polymerizable groups introduced per molecule is preferably from 2 to 20, more preferably from 3 to 10. The molecular weight of the curing agent is not particularly limited but is preferably from 200 to 10,000, more preferably from 200 to 3,000, still more preferably from 400 to 1,500. If the molecular weight is too small, there arises a problem of volatilization in the process of forming the film, whereas if the molecular weight is excessively large, the compatibility with the fluorine-containing polymer becomes bad.

The amount added of the curing agent having a cationic polymerizable group is preferably from 0.1 to 50 mass %, more preferably from 1 to 30 mass %, still more preferably from 3 to 20 mass %, based on the solid content forming the film.

Examples of the curing agent suitably used in the present invention include, as a commercially available product, Denacol EX314, Denacol Ex411, Denacol Ex421, Denacol Ex521, Denacol Ex611 and Denacol Ex612 (all produced by Nagase Chemicals Ltd.); and Celoxide GT301 and Celoxide GT401 (both produced by Daicel Chemical Industries, Ltd.).

Other examples of the curing agent useful in the present invention include Compounds A-1 to A-39 set forth in [0067] to [0073] of JP-A-2004-354740.

(Other Additives)

In the low refractive index layer, for the purpose of imparting properties such as antifouling property, water resistance, chemical resistance and slipperiness, for example, an known antifouling agent or slipping agent such as polysiloxane compound and fluorine-based is preferably added in an amount of 0.01 to 20 mass %, more preferably from 0.05 to 10 mass %, still more preferably from 0.1 to 5 mass %, based on the entire solid content of the low refractive index layer.

(Polysiloxane Compound)

Preferred examples of the polysiloxane compound include a compound containing a plurality of dimethylsilyloxy units as the repeating unit and having a substituent at the chain terminal and/or on the side chain. In the chain of the compound containing dimethylsilyloxy as the repeating unit, a structural unit other than dimethylsilyloxy may be contained.

A plurality of substituents, which may be the same or different, are preferably substituted. Preferred examples of the substituent include a group containing an acryloyl group, a methacryloyl group, a vinyl group, an allyl group, a cinnamoyl group, an epoxy group, an oxetanyl group, a hydroxyl group, a fluoroalkyl group, a polyoxyalkylene group, a carboxyl group, an amino group or the like. The molecular weight is not particularly limited but is preferably 100,000 or less, more preferably 50,000 or less, and most preferably from 3,000 to 30,000.

The silicone atom content of the polysiloxane compound is not particularly limited but is preferably 18.0 mass % or more, more preferably from 25.0 to 37.8 mass %, and most preferably from 30.0 to 37.0 mass %.

In view of antifouling durability, the polymerizable polysiloxane compound contained in the curable composition for forming the low refractive index layer of the present invention is preferably a cationic polymerizable polysiloxane compound having a cationic polymerizable group, because the low refractive index layer is formed by using a cationic polymerizable binder.

Examples of the cationic polymerizable functional group include an epoxy group or oxetane ring contained in a glycidyl group or an epoxycyclohexyl group, a vinyl ether group, an aziridine ring, a cyclic sulfide, a cyclic carbonate, a lactone ring and an oxazoline ring.

Examples of the cationic polymerizable polysiloxane compound include a polydimethylsiloxane compound having introduced into one terminal thereof a glycidyl group, a polydimethylsiloxane compound having introduced into both terminals thereof a glycidyl group, a polydimethylsiloxane compound having introduced into the side chain thereof a glycidyl group, a polydimethylsiloxane compound having introduced into both terminals thereof an epoxycyclohexyl group, and a polydimethylsiloxane compound having introduced into the side chain thereof an epoxycyclohexyl group. In such a cationic polymerizable polysiloxane compound, a functional group such as amino group, carboxyl group, carbinol group, (meth)acryloyl group, mercapto group and polyether group, may be further introduced.

Among these compounds, a polydimethylsiloxane compound having a cationic polymerizable group at both terminals is preferred in the present invention.

The cationic polymerizable polysiloxane compound preferably has a kinetic viscosity (a value at 25° C., hereinafter the same) of approximately from 10 to 20,000 mm²/s.

As for the polymerizable polysiloxane compound, some compounds are commercially available as a reactive silicone oil and these may also be used. Out of these compounds, examples of the commercial product for the cationic polymerizable polysiloxane compound include "KF-105" (modified silicone oil having glycidyl at both terminals, kinetic viscosity: 15 mm²/ s), "X-22-163A" (modified silicone oil having glycidyl at both terminals, kinetic viscosity: 30 mm²/s), "X-22-163B" (modified silicone oil having glycidyl at both terminals, kinetic viscosity: 60 mm²/s), "X-22-163C" (modified silicone oil having glycidyl at both terminals, kinetic viscosity: 120 mm²/s), "X-22-173DX" (modified silicone oil having glycidyl at one terminal, kinetic viscosity: 65 mm²/s), "KF-1001" (modified silicone oil having glycidyl in the side chain, kinetic viscosity: 17,000 mm²/s), "KF-101" (modified silicone oil having glycidyl in the side chain, kinetic viscosity: 1,500 mm²/s), "X-22-169AS" (modified silicone oil having epoxycyclohexane at both terminals, kinetic viscosity: 30 mm²/s), "X-22-169B" (modified silicone oil having epoxycyclohexane at both terminals, kinetic viscosity: 65 mm²/s), "KF-102" (modified silicone oil having epoxycyclohexane at both terminals, kinetic viscosity: 4,000 mm²/s), "X-22-3667" (modified silicone oil having epoxy in the side chain and polyether in the side chain, kinetic viscosity: 4,500 mm²/s) and "X-22-4741" (modified silicone oil having epoxy in the side chain and polyether in the side chain, kinetic viscosity: 400 mm²/s), all produced by Shin-Etsu Chemical Co., Ltd.; "BY16-855D" (modified silicone oil having glycidyl at both terminals, kinetic viscosity 10 mm²/s), "SF8411" (modified silicone oil having glycidyl in the side chain, kinetic viscosity: 8,000 mm /s), "SF8413" (modified silicone oil having glycidyl in the side chain, kinetic viscosity: 18,000 mm²/s) and "BY16-839" (modified silicone oil having epoxycyclohexyl in the side chain, kinetic viscosity: 6,000 mm²/s) all produced by Dow Corning Toray Silicone Ltd.; and "TSF4730" (modified silicone oil having glycidyl at both terminals, kinetic viscosity: 6,000 mm²/s) produced by GE Toshiba Silicones Co., Ltd.

[Formation Method of Low Refractive Index Layer]

In the present invention, the low refractive index layer of the antireflection film is preferably formed by mixing the curable composition, the binder contained as the binder in the curable composition and, if desired, other additives with an organic solvent to prepare a coating composition, and coating, drying and curing the coating composition. Since the cationic polymerization proceeds by the effect of heat, the coating film after coating and drying the coating composition is preferably heated at 80 to 150° C. for 1 to 30 minutes so that curing of the unreacted cationic polymerizable resin can proceed. The curing can also be made to proceed by storing the coating film taken up into a roll in a room at 25° C. or more for 24 hours or more.

[Hard Coat Layer]

The hard coat layer is described below.

The hard coat layer is formed by using the above-described curable composition and a binder for imparting a hard coat property contained as the binder in the curable composition and additionally using, if desired, a matting particle for imparting an antiglare property or internal scattering property, and an inorganic filler for elevating the refractive index, preventing the crosslinking shrinkage and increasing the strength.

In the present invention, in the case of laminating the low refractive index layer directly on the hard coat layer, the hard coat layer preferably contains a hydrolysate and/or a partial condensate of an organosilane compound.

The organosilane compound which can be preferably used in the hard coat layer is described below.

The organosilane compound is represented by the following formula [C]:

$$(R^{10})_m Si(X^{11})_{4-m}$$ 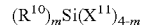 Formula [C]:

In formula [C], $R^{10}$ represents a substituted or unsubstituted alkyl group or a substituted or unsubstituted aryl group. Examples of the alkyl group include methyl, ethyl, propyl, isopropyl, hexyl, hexyl, decyl and hexadecyl. The alkyl group is preferably an alkyl group having a carbon number of 1 to 30, more preferably from 1 to 16, still more preferably 1 to 6. Examples of the aryl group include phenyl and naphthyl, with a phenyl group being preferred.

$X^{11}$ represents a hydroxyl group or a hydrolyzable group. Examples of the hydrolyzable group include an alkoxy group (preferably an alkoxy group having a carbon number of 1 to 5, such as methoxy group and ethoxy group), a halogen atom (e.g., Cl, Br, I) and a group represented by $R^{12}COO$ (wherein $R^{12}$ is preferably a hydrogen atom or an alkyl group having a carbon number of 1 to 5; such as $CH_3COO$ and $C_2H_5COO$). Among these, an alkoxy group is preferred, and a methoxy group and an ethoxy group are more preferred.

m represents an integer of 0 to 3, preferably 0, 1 or 2, more preferably 2, still more preferably 1.

When a plurality of $R^{10}$'s or $X^{11}$'s are present, the plurality of $R^{10}$'s or $X^{11}$'s may be the same or different.

The substituent contained in $R^{10}$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio, an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted. When a plurality of $R^{10}$'s are present, at least one $R^{10}$ is preferably a substituted alkyl group or a substituted aryl group. In particular, an organosilane compound having a substituent represented by the following formula (1-2) is preferred.

Formula (1-2):

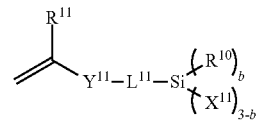

In formula (1-2), $R^{11}$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R^{11}$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group. $Y^{11}$ represents a single bond, an ester group, an amido group, an ether group or a urea group. $Y^{11}$ is preferably a single bond, an ester group or an amido group, more preferably a single bond or an ester group, still more preferably an ester group.

$L^{11}$ represents a divalent linking chain. Specific examples thereof include a substituted or unsubstituted alkylene group, a substituted or unsubstituted arylene group, a substituted or unsubstituted alkylene group having in the inside thereof a linking group (e.g., ether, ester, amido), and a substituted or unsubstituted arylene group having in the inside thereof a linking group. $L^{11}$ is preferably a substituted or unsubstituted alkylene group having a carbon number of 2 to 10, a substituted or unsubstituted arylene group having a carbon number of 6 to 20, or a substituted or unsubstituted alkylene group having in the inside thereof a linking group and having a carbon number of 3 to 10, more preferably an unsubstituted alkylene group, an unsubstituted arylene group or an alkylene group having in the inside thereof an ether or ester linking group, still more preferably an unsubstituted alkylene group or an alkylene group having in the inside thereof an ether or ester linking group. Examples of the substituent include a halogen, a hydroxyl group, a mercapto group, a carboxyl group, an epoxy group, an alkyl group and an aryl group. These substituents each may be further substituted.

b represents 0 or 1, preferably 0. $X^{11}$ has the same meaning as in formula (1) and is preferably a halogen, a hydroxyl group or an unsubstituted alkoxy group, more preferably chlorine, a hydroxyl group or an unsubstituted alkoxy group having a carbon number of 1 to 6, still more preferably a hydroxyl group or an alkoxy group having a carbon number of 1 to 3, yet still more preferably a methoxy group. When a plurality of $X^{11}$'s are present, the plurality of $X^{11}$'s may be the same or different. $R^{10}$ has the same meaning as in formula (1) and is preferably a substituted or unsubstituted alkyl group or an unsubstituted aryl group, more preferably an unsubstituted alkyl group or an unsubstituted aryl group.

Two or more kinds of the compounds represented by formulae (1) and (1-2) may be used in combination. Specific examples of the compounds represented by formulae (1) and (1-2) are set forth below, but the present invention is not limited thereto.

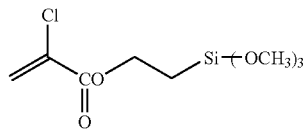
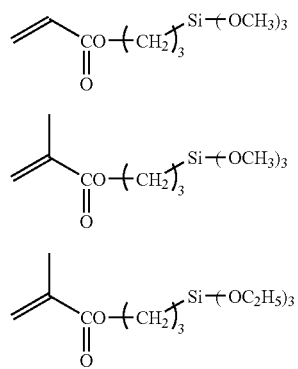

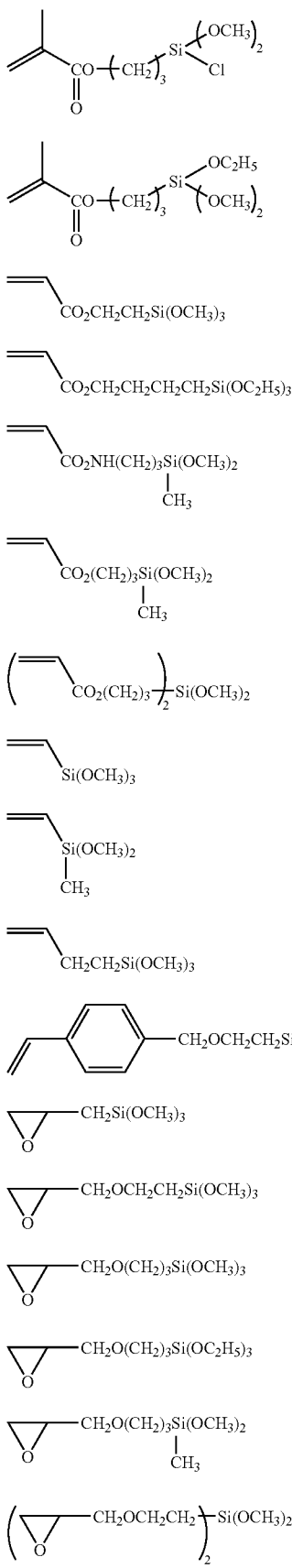
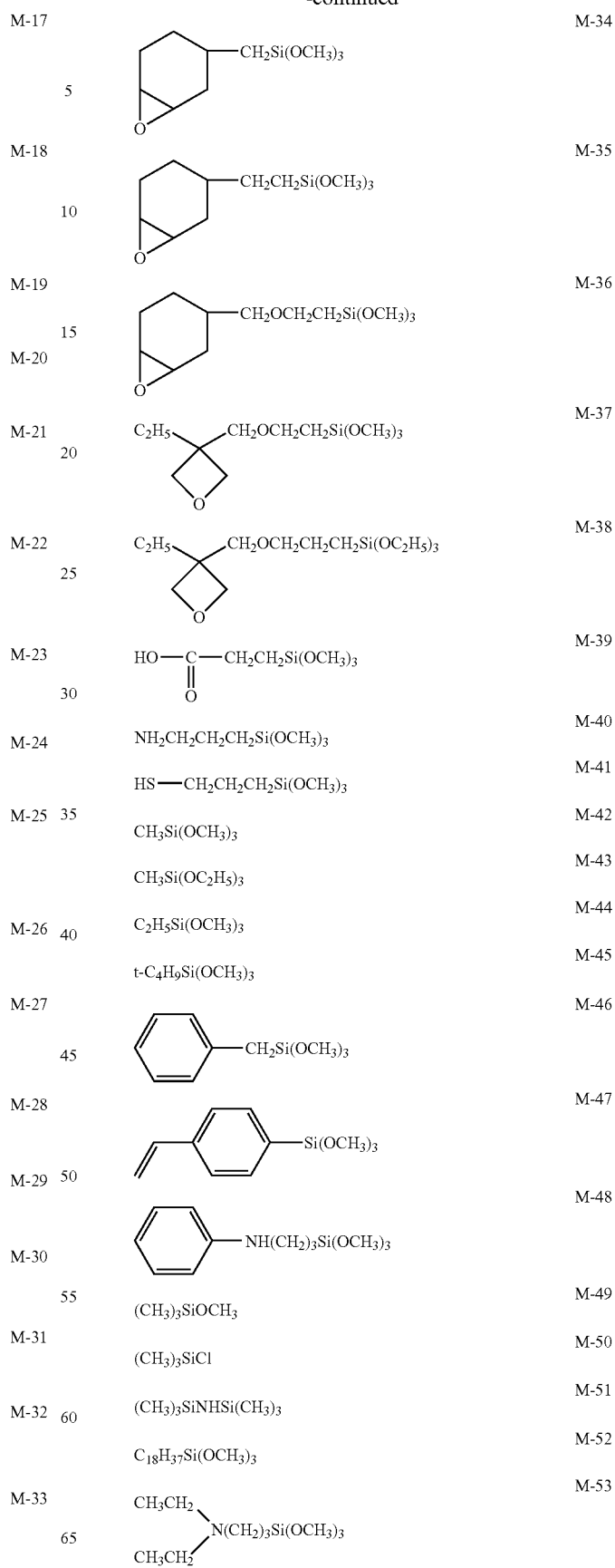

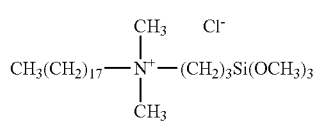

C₃H₇CH₂CH₂Si(OC₂H₅)₃    M-54

C₆F₁₃CH₂CH₂Si(OCH₃)₃    M-55

C₄F₉CH₂CH₂Si(OCH₃)₃    M-56

C₈F₁₇CH₂CH₂Si(OCH₃)₃    M-57

C₆F₁₃CH₂CH₂Si(OC₂H₅)₃    M-58

C₈F₁₇CH₂CH₂Si(OC₂H₅)₃    M-59

C₄F₉CH₂CH₂Si(OC₂H₅)₃    M-60

C₆F₁₃CH₂CH₂SiCl₃    M-61

C₈F₁₇CH₂CH₂SiCl₃    M-62

C₄F₉CH₂CH₂SiCl₃    M-63

C₆F₁₃CH₂CH₂Si(OCH₃)₂CH₃    M-64

C₆F₁₃CH₂CH₂CH₂Si(OCH₃)₃    M-65

C₄F₉CH₂CH₂CH₂Si(OCH₃)₃    M-66

C₈F₁₇CH₂CH₂CH₂CH₂Si(OCH₃)₃    M-67

C₆F₁₃CH₂Si(OC₂H₅)₃    M-68

C₈F₁₇CH₂CH₂Si(OC₄H₉)₃    M-69

C₄F₉CH₂CH₂CH₂Si(OCH₃)₃    M-70

C₆F₁₃CH₂CH₂Si(OCH₃)₂Br    M-71

C₈F₁₇CH₂CH₂CH₂Si(OCH₃)₂Cl    M-72

C₄F₉CH₂CH₂Si(CH₃)₂OCH₃    M-73

C₆F₁₃CH₂CH₂Si(OCH₃)Cl₂    M-74

(CF₃)₂CFCF₂CF₂CH₂CH₂Si(OCH₃)₃    M-75

(C₄F₉)₂CFCH₂CH₂Si(OCH₃)₃    M-76

(C₆F₁₃)₂CFCH₂CH₂Si(OCH₃)₃    M-77

(CF₃)₃CCF₂CH₂CH₂Si(OCH₃)₃    M-78

(C₄F₉)₃CCH₂CH₂Si(OCH₃)₃    M-79

(CF₃)₂CFOCH₂CH₂CH₂Si(OC₂H₅)₃    M-80

(CF₃)₂CFOCH₂CH₂CH₂SiCl₃    M-81

H(CF₂)₆CH₂Si(OCH₃)₃    M-82

H(CF₂)₄CH₂Si(OCH₃)₃    M-83

H(CF₂)₈CH₂Si(OCH₃)₃    M-84

M-85

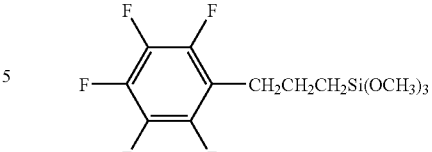
M-86

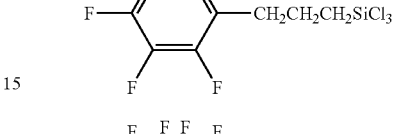
M-87

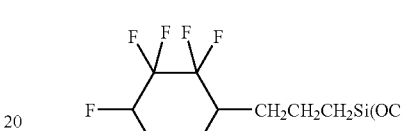
M-88

Among these specific examples, (M-1), (M-2), (M-30), (M-35) and (M-49) are preferred.

[Binder for Forming Hard Coat Layer]

The binder is preferably a polymer having a saturated hydrocarbon chain or a polyether chain as the main chain, more preferably a polymer having a saturated by hydrocarbon chain as the main chain. Also, the binder polymer preferably has a crosslinked structure. The binder polymer having a saturated hydrocarbon chain as the main chain is preferably a polymer of an ethylenically unsaturated monomer. The binder polymer having a saturated hydrocarbon chain as the main chain and having a crosslinked structure is preferably a (co)polymer of a monomer having two or more ethylenically unsaturated groups.

Examples of the monomer having two or more ethylenically unsaturated groups include an ester of a polyhydric alcohol and a (meth)acrylic acid {e.g., ethylene glycol di(meth)acrylate, 1,4-dichlorohexane diacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, pentaerythritol hexa(meth) acrylate, 1,3,5-cyclohexanetriol triacrylate, polyurethane polyacrylate, polyester polyacrylate}; a vinylbenzene and a derivative thereof (e.g., 1,4-divinylbenzene, 2-acryloylethyl 4-vinylbenzoate, 1,4-divinylcyclohexanone); a vinylsulfone (e.g., divinylsulfone); an acrylamide (e.g., methylenebisacrylamide); and a methacrylamide.

In the case where the low refractive index layer is laminated directly on the hard coat layer, for the purpose of improving the adhesion of the low refractive index layer to the hard coat layer, the hard coat layer is preferably formed of a curable composition containing a compound having a cationic polymerizable group, because an unreacted cationic polymerizable group can be caused to exist on the hard coat layer surface and by virtue of its polymerization with the cationic polymerizable group in the curable composition for low refractive index layer at the lamination of the low refractive index layer, the adhesion between the low refractive index layer and the hard coat layer can be strengthened.

The compound having a cationic polymerizable group contained in the curable composition for forming the hard coat layer preferably occupies 5 mass % or more, more preferably 10 mass % or more, still more preferably 20 mass % or more, of all binders.

In order to elevate the refractive index, the monomer preferably contains in the structure thereof an aromatic ring or at least one atom selected from the group consisting of a halogen atom (excluding fluorine), a sulfur atom, a phosphorus atom and a nitrogen atom.

Specific examples of the high refractive index monomer include bis(4-methacryloylthiophenyl)sulfide, vinylnaphthalene, vinylphenylsulfide and 4-methacryloxyphenyl-4'-methoxyphenylthioether.

The polymerization of such a monomer having an ethylenically unsaturated group may be performed by the irradiation of ionizing radiation or under heat in the presence of a photoradical initiator or a thermal radical initiator. Accordingly, the hard coat layer can be formed on a transparent support by preparing a coating solution containing a monomer having an ethylenically unsaturated group, a photoradical or thermal radical initiator, a matting particle and an inorganic fine particle, applying the coating solution to a transparent support, and curing the coating film through a polymerization reaction by the effect of ionizing radiation or heat.

The polymer having a polyether as the main chain is preferably a ring-opened polymer of a polyfunctional epoxy compound. The ring-opening polymerization of a poly-functional epoxy compound can be performed by the irradiation of ionizing radiation or under heat in the presence of a photoacid generator or a thermal acid generator. Accordingly, the hard coat layer can be formed on a transparent support by preparing a coating solution containing a polyfunctional epoxy compound, a photoacid or thermal acid generator, a matting particle and an inorganic fine particle, applying the coating solution to a transparent support, and curing the coating film through a polymerization reaction by the effect of ionizing radiation or heat.

These polyfunctional monomers, that is, the monomer having two or more ethylenically unsaturated groups and the ring-opening polymerizable polyfunctional monomer such as polyfunctional epoxy compound, each may be used in combination of two or more kinds thereof.

The functional group in the ionizing radiation-curable polyfunctional monomer or oligomer for forming the binder is preferably a photopolymerizable functional group, an electron beam-polymerizable functional group or a radiation-polymerizable functional group. Among these, a photopolymerizable functional group is more preferred. Examples of the photopolymerizable functional group include an unsaturated polymerizable functional group such as (meth)acryloyl group, vinyl group, styryl group and allyl group, with a (meth)acryloyl group being preferred.

For the polymerization reaction of the photopolymerizable polyfunctional monomer, a photopolymerization initiator is preferably used. The photopolymerization initiator is preferably a photoradical polymerization initiator or a photo-cationic polymerization initiator, more preferably a photoradical polymerization initiator.

Examples of the photopolymerization initiator include acetophenones, benzophenones, Michler's benzoylbenzoate, α-amyloxime ester, tetramethylthiuram monosulfide and thioxanthones.

Examples of the commercially available photoradical polymerization initiator include Kayacure (e.g., DETX-S, BP-100, BDMK, CTX, BMS, 2-EAQ, ABQ, CPTX, EPD, ITX, QTX, BTC, MCA) produced by Nippon Kayaku Co., Ltd.; Irgacure (e.g., 651, 184, 500, 907, 369, 1173, 2959, 4265, 4263) produced by Ciba Specialty Chemicals); Esacure (e.g., KIP100F, KB1, EB3, BP, X33, KT046, KT37, KIP150, TZT) produced by Sartomer Company Inc.

Particularly, a photoradical polymerization initiator of photo-cleavage type is preferred. The photoradical polymerization initiator of photo-cleavage type is described in *Saishin UV Koka Gijutsu* (*Latest UV Curing Technology*), page 159, Kazuhiro Takausu (publisher), Gijutsu Joho Kyokai (publishing company) (1991).

Examples of the commercially available photoradical polymerization initiator of photo-cleavage type include Irgacure (651, 184, 907) produced by Ciba Specialty Chemicals.

As for the photo-cationic polymerization initiator, the above-described photo-cationic polymerization initiator usable in the curable composition for forming the low refractive index layer can be used. In particular, a diaryl iodonium salt is preferred for the hard coat layer because of less coloration after curing.

The photopolymerization initiator is preferably used in an amount of 0.1 to 15 parts by mass, more preferably from 1 to 10 parts by mass, per 100 parts by mass of the polyfunctional monomer.

In addition to the photopolymerization initiator, a photosensitizer may be used. Specific examples of the photosensitizer include n-butylamine, triethylamine, tri-n-butylphosphine, Michler's ketone and thioxanthone.

Examples of the commercially available photosensitizer include Kayacure (DMBI, EPA) produced by Nippon Kayaku Co., Ltd.

The photopolymerization reaction is preferably performed by irradiating an ultraviolet ray after coating and drying the coating solution for forming the hard coat layer.

In place of or in addition to the monomer having two or more ethylenically unsaturated groups, a monomer having a crosslinking functional group may be used to introduce a crosslinking functional group into the polymer, so that a crosslinked structure can be introduced into the binder polymer by the reaction of this crosslinking functional group. Examples of the crosslinking functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivative, a melamine, an etherified methylol, an ester, a urethane or a metal alkoxide such as tetramethoxysilane can be used as a monomer for introducing a crosslinked structure. A functional group which exhibits the crosslinking property as a result of decomposition reaction, such as block isocyanate group, may also be used. In other words, the crosslinking functional group for use in the present invention may be a group which does not directly cause a reaction but exhibits reactivity as a result of decomposition. The binder polymer having such a crosslinking functional group is coated and then heated, whereby a crosslinked structure can be formed.

[Matting Particle]

For the purpose of imparting an antiglare property and an internal scattering property, the hard coat layer contains, if desired, a matting particle having an average particle diameter of 1 to 10 μm, preferably from 1.5 to 7.0 μm, such as inorganic compound particle or resin particle. Specific preferred examples of the matting particle include an inorganic compound particle such as silica particle and $TiO_2$ particle; and a resin particle such as crosslinked acryl particle, crosslinked acryl-styrene particle, crosslinked styrene particle, melamine resin particle and benzoguanamine resin particle. Among these, a crosslinked acryl particle, a crosslinked acryl-styrene particle and a crosslinked styrene particle are more preferred. The shape of the matting particle may be either true spherical or amorphous. Also, two or more different kinds of matting particles may be used in combination. The matting particle is preferably contained in the antiglare hard coat layer such that the amount of the matting particle in the antiglare hard coat layer formed becomes from 10 to 1,000 mg/m$^2$, more preferably from 30 to 100 mg/m$^2$. In a more preferred embodiment, a crosslinked styrene particle is used as the matting particle, and a crosslinked styrene particle having a particle diameter larger than a half of the thickness of the hard coat layer occupies from 40 to 100% in all crosslinked styrene particles. Here, the particle size distribution of the matting particle is measured by a Coulter counter method, and the measured distribution is converted into the particle number distribution.

[Inorganic Fine Particle]

In addition to the above-described matting particle, for elevating the refractive index of the hard coat layer, the hard coat layer preferably contains an inorganic fine particle comprising an oxide of at least one metal selected from the group consisting of titanium, zirconium, aluminum, indium, zinc, tin and antimony and having an average particle diameter of 0.001 to 0.2 µm, preferably from 0.001 0.1 µm, more preferably from 0.001 to 0.06 µm. Specific examples of the inorganic fine particle for use in the hard coat layer include $TiO_2$, $ZrO_2$, $Al_2O_3$, $In_2O_3$, $ZnO$, $SnO_2$, $Sb_2O_3$ and tin-doped indium oxide (ITO). Among these, $TiO_2$ and $ZrO_2$ are preferred in view of elevation in the refractive index. The surface of the inorganic fine particle is preferably subjected to a silane coupling treatment or a titanium coupling treatment. A surface treating agent having a functional group capable of reacting with the binder species is preferably used on the filler surface.

The amount added of the inorganic fine particle is preferably from 10 to 90 mass %, more preferably from 20 to 80 mass %, still more preferably from 30 to 75 mass %, based on the entire mass of the hard coat layer.

Incidentally, such an inorganic fine particle has a particle diameter sufficiently smaller than the wavelength of light and therefore, causes no scattering and the dispersion obtained by dispersing the filler in the binder polymer behaves as an optically uniform substance.

The mixture of the binder and the inorganic fine particle in the hard coat layer preferably has a refractive index of 1.57 to 2.00, more preferably from 1.60 to 1.80. The refractive index in this range can be attained by appropriately selecting the kind and amount ratio of the binder and the inorganic fine particle. The kind and amount ratio to be selected can be easily known in advance by an experiment.

The thickness of the hard coat layer is preferably from 1 to 10 µm, more preferably from 1.2 to 6 µm.

[Antiglare Layer]

The antiglare layer is formed in the film for the purpose of imparting an antiglare property by the effect of surface scattering and also preferably imparting a hard coat property for enhancing the scratch resistance of the film. Accordingly, the antiglare layer preferably comprises, as essential components, a light-transparent resin capable of imparting a hard coat property, a light-transparent fine particle for imparting an antiglare property, and a solvent.

In the present invention, the antiglare layer and/or the above-described antiglare hard coat layer preferably has a surface irregularity shape such that the centerline average roughness (Ra) is from 0.08 to 0.30 µm. If the Ra is less than 0.08, a sufficiently high antiglare property cannot be obtained, whereas if it exceeds 0.30, there arises a problem such as glaring or surface whitening due to reflection of outside light.

[High (Medium) Refractive Index Layer]

The refractive index of the high refractive index layer is preferably from 1.55 to 2.40, more preferably from 1.60 to 2.20, still more preferably from 1.65 to 2.10, and most preferably from 1.80 to 2.00. In the case of using a medium refractive index layer in the antireflection film, the refractive index thereof is adjusted to a value between the refractive index of the low refractive index layer and the refractive index of the high refractive index layer. The refractive index of the medium refractive index layer is preferably from 1.55 to 1.80. The haze of the high refractive index layer and the medium refractive index layer is preferably 3% or less.

[High Refractive Index Inorganic Fine Particle]

For the high refractive index layer and the medium refractive index layer, a cured product of a composition prepared by dispersing an inorganic fine particle having a high refractive index layer in a monomer, an initiator and an organosilane compound which are described later, is preferably used.

The high refractive index inorganic fine particle is preferably an oxide of a metal (e.g., aluminum, titanium, zirconium, antimony). In view of the refractive index, a titanium dioxide fine particle is most preferred. In the case of using a monomer and an initiator, the monomer is cured through a polymerization reaction by the effect of ionizing radiation or heat after coating, whereby a medium or high refractive index layer excellent in the scratch resistance and adhesive property can be formed. The average particle diameter of the inorganic fine particle is preferably from 10 to 100 nm.

The titanium dioxide fine particle is preferably an inorganic fine particle mainly comprising titanium dioxide and containing at least one element selected from cobalt, aluminum and zirconium. The "mainly comprising a certain component" means that the content (mass%) of the component is highest among the components constituting the particle.

The inorganic fine particle mainly comprising titanium dioxide for use in the present invention preferably has a refractive index of 1.90 to 2.80, more preferably from 2.10 to 2.80, and most preferably from 2.20 to 2.80.

The mass average primary particle diameter of the inorganic fine particle mainly comprising titanium dioxide is preferably from 1 to 200 nm, more preferably from 1 to 150 nm, still more preferably from 1 to 100 nm, yet still more preferably from 1 to 80 nm.

The particle diameter of the inorganic fine particle can be measured by a light scattering method or an electron microphotograph. The specific surface area of the inorganic fine particle is preferably from 10 to 400 m$^2$/g, more preferably from 20 to 200 m$^2$/g, and most preferably from 30 to 150 m$^2$/g.

As for the crystal structure of the inorganic fine particle mainly comprising titanium dioxide, the main component is preferably a rutile structure, a rutile and anatase mixed crystal, an anatase structure or an amorphous structure, more preferably a rutile structure. The main component means a component of which content (mass%) is highest among the components constituting the particle.

By virtue of incorporating at least one element selected from Co (cobalt), Al (aluminum) and Zr (zirconium) into the inorganic fine particle mainly comprising titanium dioxide, the photocatalytic activity of the titanium dioxide can be suppressed and the weather resistance of the high refractive index layer and the medium refractive index layer can be improved. The element is preferably Co (cobalt). A combination use of two or more kinds of elements is also preferred.

[Dispersant of Inorganic Fine Particle]

The inorganic fine particle mainly comprising titanium dioxide, which is used in the high refractive index layer and the medium refractive index layer, can be dispersed by using a dispersant. At the dispersion of the inorganic fine particle mainly comprising titanium dioxide, a dispersant having an anionic group is preferably used.

As for the anionic group, a group having an acidic proton, such as carboxyl group, sulfonic acid group (sulfo group), phosphoric acid group (phosphono group) and sulfonamide group, or a salt thereof is effective. In particular, a carboxyl group, a sulfonic acid group, a phosphonic acid group, and a salt thereof are preferred, and a carboxyl group and a phosphoric acid group are more preferred. The number of anionic groups contained per one molecule of the dispersant may be sufficient if it is 1 or more. For the purpose of more improving the dispersibility of the inorganic fine particle, a plural number of anionic groups may be contained. The average number of anionic groups is preferably 2 or more, more preferably 5 or more, still more preferably 10 or more. Also, plural kinds of anionic groups may be contained in one molecule of the dispersant.

The dispersant preferably further contains a crosslinking or polymerizable functional group. Examples of the crosslinking or polymerizable functional group include an ethylenically unsaturated group (e.g., (meth)acryloyl, allyl, styryl, vinyloxy) capable of an addition reaction/polymerization reaction by the effect of a radical species; a cationic polymerizable group (e.g., epoxy, oxatanyl, vinyloxy); and a polycondensation reactive group (e.g., hydrolyzable silyl, N-methylol). Among these, a functional group having an ethylenically unsaturated group is preferred.

The dispersant used for dispersing the inorganic fine particle mainly comprising titanium dioxide, which is used in the high refractive index layer, is preferably a dispersant having an anionic group and a crosslinking or polymerizable functional group and at the same time, having the crosslinking or polymerizable functional group in the side chain.

The mass average molecular weight (Mw) of the dispersant having an anionic group and a crosslinking or polymerizable functional group and at the same time, having the crosslinking or polymerizable functional group in the side chain is not particularly limited but is preferably 1,000 or more, more preferably from 2,000 to 1,000,000, still more preferably from 5,000 to 200,000, yet still more preferably from 10,000 to 100,000.

The amount of the dispersant used is preferably from 1 to 50 mass %, more preferably from 5 to 30 mass %, and most preferably from 5 to 20 mass %, based on the inorganic fine particle. Also, two or more kinds of dispersants may be used in combination.

[Dispersion Method of Inorganic Fine Particle]

The inorganic fine particle mainly comprising titanium dioxide, which is used in the high refractive index layer and the medium refractive index layer, is preferably used in the dispersion state for the formation of the high refractive index layer and the medium refractive index layer.

(Dispersion Medium)

The dispersion medium is preferably a liquid having a boiling point of 60 to 170° C. Examples of the dispersion medium include water, an alcohol (e.g., methanol, ethanol, isopropanol, butanol, benzyl alcohol), a ketone (e.g., acetone, methyl ethyl ketone, methyl isobutyl ketone, cyclohexanone), an ester (e.g., methyl acetate, ethyl acetate, propyl acetate, butyl acetate, methyl formate, ethyl formate, propyl formate, butyl formate), an aliphatic hydrocarbon (e.g., hexane, cyclohexane), a halogenated hydrocarbon (e.g., methylene chloride, chloroform, carbon tetrachloride), an aromatic hydrocarbon (e.g., benzene, toluene, xylene), an amide (e.g., dimethylformamide, dimethylacetamide, n-methylpyrrolidone), an ether (e.g., diethyl ether, dioxane, tetrahydrofuran) and an ether alcohol (e.g., 1-methoxy-2-propanol). Among these, preferred are toluene, xylene, methyl ethyl ketone, methyl isobutyl ketone, cyclohexanone and butanol. The dispersion medium is more preferably methyl ethyl ketone, methyl isobutyl ketone or cyclohexanone.

The inorganic fine particle is dispersed by using a disperser. Examples of the disperser include a sand grinder mill (e.g., bead mill with pin), a high-speed impeller, a pebble mill, a roller mill, an attritor and a colloid mill. Among these, a sand grinder mill and a high-speed impeller are preferred. Also, a preliminary dispersion treatment may be performed. Examples of the disperser for use in the preliminary dispersion treatment include a ball mill, a three-roll mill, a kneader and an extruder.

The inorganic fine particle is preferably dispersed in the dispersion medium to have a particle diameter as small as possible. The mass average particle diameter is preferably from 1 to 200 nm, more preferably from 5 to 150 nm, still more preferably from 10 to 100 nm, yet still more preferably from 10 to 80 nm. By dispersing the inorganic fine particle to have a small particle diameter of 200 nm or less, a high or medium refractive index layer not impairing the transparency can be formed.

[Formation Method of High (Medium) Refractive Index Layer]

The high refractive index layer and the medium refractive index layer for use in the present invention each is preferably formed as follows. A coating composition for the formation of the high or medium refractive index layer is prepared by dispersing the inorganic fine particle in a dispersion medium as described above and preferably further adding to the resulting liquid dispersion a binder precursor (for example, ionizing radiation-curable polyfunctional monomer or oligomer described later) necessary for the matrix formation, a photopolymerization initiator and the like, and the obtained coating composition for the formation of the high or medium refractive index layer is coated on a transparent support and cured through a crosslinking or polymerization reaction of the ionizing radiation-curable compound (for example, a polyfunctional monomer or oligomer).

Simultaneously with or after the coating of the high or medium refractive index layer, the binder of the layer is preferably crosslinked or polymerized with the dispersant. As for the binder of the high refractive index layer and the medium reactive index layer, a binder described with respect to the hard coat layer is preferably used by selecting a polymerization initiator according to the binder species.

The binder of the thus-produced high or medium refractive index layer takes a form such that the anionic group of the dispersant is taken into the binder as a result of crosslinking or polymerization reaction between the above-described preferred dispersant and the ionizing radiation-curable polyfunctional monomer or oligomer. The anionic group taken into the binder of the high or medium refractive index layer has a function of maintaining the dispersed state of the inorganic fine particle, and the crosslinked or polymerized structure imparts a film-forming ability to the binder, whereby the high or medium refractive index layer containing the inorganic fine particle is improved in the physical strength, chemical resistance and weather resistance.

The functional group in the ionizing radiation-curable polyfunctional monomer or oligomer for forming the binder is preferably a photopolymerizable functional group, an electron beam-polymerizable functional group or a radiation-polymerizable functional group. Among these, a photopolymerizable functional group is more preferred. Examples of the photopolymerizable functional group include an unsaturated polymerizable functional group such as (meth)acryloyl group, vinyl group, styryl group and allyl group, with a (meth)acryloyl group being preferred.

Specific examples of the photopolymerizable polyfunctional monomer having a photopolymerizable functional group include:

(meth)acrylic acid diesters of alkylene glycol, such as neopentyl glycol acrylate, 1,6-hexanediol (meth)acrylate and propylene glycol di(meth)acrylate;

(meth)acrylic acid diesters of polyoxyalkylene glycol, such as triethylene glycol di(meth)acrylate, dipropylene glycol di(meth)acrylate, polyethylene glycol di(meth)acrylate and polypropylene glycol di(meth)acrylate;

(meth)acrylic acid diesters of polyhydric alcohol, such as pentaerythritol di(meth)acrylate; and (meth)acrylic acid diesters of ethylene oxide or propylene oxide adduct, such as 2,2-bis{4-(acryloxy-diethoxy)phenyl}propane and 2,2-bis{4-(acryloxy-polypropoxy)phenyl) propane.

Furthermore, epoxy (meth)acrylates, urethane (meth)acrylates and polyester (meth)acrylates are also preferably used as the photopolymerizable polyfunctional monomer.

Among these, esters of a polyhydric alcohol with a (meth)acrylic acid are preferred, and a polyfunctional monomer having three or more (meth)acryloyl groups within one molecule is more preferred. Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, dipentaerythritol triacrylate, dipentaerythritol pentaacrylate, dipentaerythritol tetra(meth)acrylate, dipentaerythritol hexa(meth)acrylate, tripentaerythritol triacrylate and tripentaerythritol hexatriacrylate.

Two or more kinds of polyfunctional monomers may be used in combination.

For the polymerization reaction of the photopolymerizable polyfunctional monomer, a photopolymerization initiator is preferably used. The photopolymerization initiator is preferably a photoradical polymerization initiator or a photo-cationic polymerization initiator, more preferably a photoradical polymerization initiator.

As for the photoradical polymerization initiator, the same as that used in the curable composition for the hard coat layer may be used, and examples of the commercially available photoradical polymerization initiator are also the same. Furthermore, similarly, the photoradical polymerization initiator is preferably a photoradical polymerization initiator of photo-cleavage type, and examples of the commercially available photoradical polymerization initiator of photo-cleavage type are also the same.

The photopolymerization initiator is preferably used in an amount of 0.1 to 15 parts by mass, more preferably from 1 to 10 parts by mass, per 100 parts by mass of the polyfunctional monomer.

In addition to the photopolymerization initiator, a photosensitizer may be used. Specific examples of the photosensitizer are the same as those used in the curable composition for the hard coat layer, and examples of the commercially available photosensitizer are also the same.

The photopolymerization reaction is preferably performed by the irradiation of an ultraviolet ray after coating and drying the hard coat layer.

For producing an antireflection film of two-layer thin film interference type by forming a low refractive index layer on a high refractive index layer, the refractive index of the high refractive index layer is preferably from 1.55 to 2.40, more preferably from 1.60 to 2.20, still more preferably from 1.65 to 2.10, and most preferably from 1.80 to 2.00.

In the case of a three-layer thin film interference type where a medium refractive index layer and a low refractive index layer are formed on a high refractive index layer, the refractive index of the high refractive index layer is preferably from 1.65 to 2.40, more preferably from 1.70 to 2.20, still more preferably from 1.80 to 2.10. The refractive index of the medium refractive index layer is adjusted to a value between the refractive index of the low refractive index layer and the refractive index of the high refractive index layer. The refractive index of the medium refractive index layer is preferably from 1.55 to 1.80, more preferably from 1.58 to 2.00, still more preferably from 1.60 to 1.80. The haze of the high refractive index layer and the medium refractive index layer is preferably 3% or less.

The high (medium) refractive index layer may contain, in addition to the above-described components (e.g., inorganic fine particle, polymerization initiator, photosensitizer), a resin, a surfactant, an antistatic agent, a coupling agent, a thickening agent, a coloration inhibitor, a colorant (e.g., pigment, dye), a defoaming agent, a leveling agent, a flame retardant, an ultraviolet absorbent, an infrared absorbent, an adhesion-imparting agent, a polymerization inhibitor, an antioxidant, a surface modifier, an electrically conducting metal fine particle and the like.

[Antistatic Layer]

The antistatic layer for use in the present invention is described below.

In the optical functional film such as antireflection film of the present invention, by forming an antistatic layer, a dust (e.g., dirt) can be prevented from attaching to the optical functional film surface, that is, excellent dust resistance can be brought out. The dust resistance can be brought out by decreasing the surface resistance value on the optical functional film (e.g., antireflection film) surface.

In the antireflection film of the present invention, the surface resistance value of the surface on the side having a low refractive index layer containing a fluorine-containing compound is preferably $1\times10^{13}$ Ω/square or less, more preferably $1\times10^{12}$ Ω/square or less, still more preferably $1\times10^{11}$ Ω/square or less, yet still more preferably $1\times10^{9}$ Ω/square or less, and particularly preferably $1\times10^{8}$ Ω/square or less.

In the optical functional film such as antireflection film of the present invention, the antistatic layer may be formed by either a vapor phase method (e.g., vacuum vapor deposition, sputtering, ion plating, plasma CVD) or a coating method, but the coating method is preferred because the antistatic layer can be produced at a low cost.

As for the antistatic layer, at least one antistatic layer is preferably formed on a transparent support. The antistatic layer may be formed either between the transparent support and the outermost low refractive index layer containing a fluorine-containing compound or on the side opposite the surface having formed thereon the low refractive index layer with respect to the transparent support, but is preferably formed between the transparent support and the low refractive index layer, more preferably at the position closer to the low refractive index layer between the transparent support and the low refractive index layer.

The production of the antistatic layer by a vapor phase method can be performed, for example, by vapor-depositing or sputtering an electrically conducting substance on the film.

Specific examples of the usable electrically conducting substance include a metal simple substance such as aluminum, copper, gold, silver, nickel, chromium, iron, molybdenum, titanium, tungsten and tantalum, an alloy thereof, and a metal oxide such as ATO, ITO and aluminum-doped zinc oxide.

In the case of producing the antistatic layer by coating, the antistatic layer is preferably produced by incorporating an electrically conducting material (e.g., electronic conduction-type electrically conducting particle, ion conduction-type organic compound) into a binding agent (e.g., binder). In particular, an electron conduction-type electrically conducting material is preferred, because this material is insusceptible to the environmental change, ensuring stable electrically conducting performance, and particularly, exhibits good electrically conducting performance even in a low-humidity environment.

A preferred embodiment in the case of producing the antistatic layer by coating is described below.

[Electrically Conducting Material]

The electrically conducting material for use in the antistatic layer is preferably an electron conduction-type electrically conducting material such as π-conjugated electrically conducting organic compound and electrically conducting fine particle.

Examples of the π-conjugated electrically conducting organic compound include an aliphatic conjugated system (e.g., polyacetylene), an aromatic conjugated system (e.g., poly(paraphenylene)), a heterocyclic conjugated system (e.g., polypyrrole, polythiophene), a heteroatom-containing conjugated system (e.g., polyaniline), and a mixture-type conjugated system (e.g., poly(phenylene vinylene)).

Examples of the electrically conducting fine particle include a carbon-based fine particle, a metal-based fine particle, a metal oxide-based fine particle and an electrically conducting coated fine particle.

Examples of the carbon-based fine particle include a carbon powder such as carbon black, ketjen black and acetylene black, a carbon fiber such as PAN-based carbon fiber and pitch-based carbon fiber, and a carbon flake as a ground product of expanded graphite.

Examples of the metal-based fine particle include a powder of a metal (e.g., aluminum, copper, gold, silver, nickel, chromium, iron, molybdenum, titanium, tungsten, tantalum) or an alloy containing such a metal, a metal flake, and a metal fiber of iron, copper, stainless steel, silver-plated copper, brass or the like.

Examples of the metal oxide-based fine particle include tin oxide, ATO, ITO, zinc oxide and aluminum-doped zinc oxide.

Preferred examples of the electrically conducting coated fine particle include an electrically conducting fine particle obtained by coating the surface of various fine particles such as titanium oxide (spherical or needle-like), potassium titanate, aluminum borate, barium sulfate, mica and silica, with an electrically conducting material such as tin oxide, ATO and ITO, and a resin bead such as polystyrene, acrylic resin, epoxy resin, polyamide resin and polyurethane resin which are surface-treated with a metal such as gold and/or nickel.

The electrically conducting material for the antistatic layer is preferably a π-conjugated electrically conducting organic compound (particularly, a polythiophene-based electrically conducting polymer), and the electrically conducting fine particle is preferably a metal-based fine particle (particularly, gold, silver, silver/palladium alloy, copper, nickel and aluminum) or a metal oxide-based fine particle (particularly, tin oxide, ATO, ITO, zinc oxide and aluminum-doped zinc oxide). The electron conduction-type electrically conducting material is more preferably a metal or a metal oxide, still more preferably a metal oxide-based fine particle.

The mass average primary particle diameter of the electrically conducting material is preferably from 1 to 200 nm, more preferably from 1 to 150 nm, still more preferably from 1 to 100 nm, yet still more preferably from 1 to 80 nm. The average particle diameter of the electrically conducting material can be measured by a light scattering method or an electron microphotograph.

The specific surface area of the electrically conducting material is preferably from 10 to 400 $m^2/g$, more preferably from 20 to 200 $m^2/g$, and most preferably from 30 to 150 $m^2/g$.

The shape of the electrically conducting material is preferably a pebble form, a spherical form, a cubic form, a spindle form, a scale form, a needle form or an amorphous form, more preferably an amorphous form, a needle form or a scale form.

[Formulation Method of Antistatic Layer]

In the case of producing the antistatic layer by the coating method, the electrically conducting material is preferably used in the dispersion state for the formation of the antistatic layer. At the dispersion, the electrically conducting material is preferably dispersed in a dispersion medium in the presence of a dispersant. By virtue of dispersion with use of a dispersant, the electrically conducting material can be very finely dispersed and a transparent antistatic layer can be produced. Particularly, in the case of using the antistatic layer as an optical interference layer and imparting an antireflection function to the layer, when the electrically conducting material is finely dispersed, this is advantageous in that the transparency of the layer as well as the antireflection function can be enhanced.

At the dispersion of the electrically conducting material for use in the present invention, a dispersant having an anionic group is preferably used. As for the anionic group, a group having an acidic proton, such as carboxyl group, sulfonic acid group (sulfo group), phosphoric acid group (phosphono group) and sulfonamide group, or a salt thereof is effective. In particular, a carboxyl group, a sulfonic acid group, a phosphonic acid group, and a salt thereof are preferred, and a carboxyl group and a phosphoric acid group are more preferred.

The number of anionic groups contained per one molecule of the dispersant may be sufficient if it is 1 or more. For the purpose of more improving the dispersibility of the electrically conducting material, a plural number of anionic groups may be contained per one molecule of the dispersant. The average number of anionic groups per one molecule is preferably 2 or more, more preferably 5 or more, still more preferably 10 or more. Also, plural kinds of anionic groups may be contained in one molecule of the dispersant.

Examples of the dispersant having an anionic polar group include "Phosphanol" (e.g., PE-510, PE-610, LB-400, EC-6103, RE-410) {produced by Toho Chemical Industrial Co., Ltd.}, and "Disperbyk" (e.g., -110, -111, -116, -140, -161, -162, -163, -164, -170, -171) {produced by BYK Chemie Japan}.

The dispersant preferably further contains a crosslinking or polymerizable functional group.

Examples of the crosslinking or polymerizable functional group include an ethylenically unsaturated group {e.g., (meth)acryloyl, allyl, styryl, vinyloxy) capable of undergoing a crosslinking reaction/polymerization reaction by the effect of a radical species; a cationic polymerizable group (e.g., epoxy, oxatanyl, vinyloxy); and a polycondensation reactive group (e.g., hydrolyzable silyl, N-methylol). Among these, a functional group having an ethylenically unsaturated group is preferred. The crosslinking or polymerizable functional group of the dispersant is preferably present in the side chain.

The mass average molecular weight (Mw) of the dispersant having an anionic group and a crosslinking or polymerizable functional group and at the same time, having the crosslinking or polymerizable functional group in the side chain is not particularly limited but is preferably 1,000 or more, more preferably from 2,000 to 1,000,000, still more preferably from 5,000 to 200,000, yet still more preferably from 10,000 to 100,000.

The amount of the dispersant used is preferably from 1 to 50 mass %, more preferably from 5 to 30 mass %, and most preferably from 5 to 20 mass %, based on the electrically conducting material. Also, two or more kinds of dispersants may be used in combination.

(Dispersion Medium)

The electrically conducting material is preferably dispersed in a dispersion medium in the presence of a dispersant.

The dispersion medium is preferably a liquid having a boiling point of 60 to 170° C. Examples of the dispersion medium include water, an alcohol (e.g., methanol, ethanol, isopropanol, butanol, benzyl alcohol), a ketone (e.g., acetone, methyl ethyl ketone, methyl isobutyl ketone, cyclohexanone), an ester (e.g., methyl acetate, ethyl acetate, propyl acetate, butyl acetate, methyl formate, ethyl formate, propyl formate, butyl formate), an aliphatic hydrocarbon (e.g., hexane, cyclohexane), a halogenated hydrocarbon (e.g., methylene chloride, chloroform, carbon tetrachloride), an aromatic hydrocarbon (e.g., benzene, toluene, xylene), an amide (e.g., dimethylformamide, dimethylacetamide, n-methylpyrrolidone), an ether (e.g., diethyl ether, dioxane, tetrahydrofuran) and an ether alcohol (e.g., 1-methoxy-2-propanol). Among these, preferred are toluene, xylene, methyl ethyl ketone, methyl isobutyl ketone, cyclohexanone and butanol. The dispersion medium is more preferably methyl ethyl ketone, methyl isobutyl ketone or cyclohexanone.

The electrically conducting material is preferably dispersed by using a disperser. Examples of the disperser include a sand grinder mill (e.g., bead mill with pin), a Dyno-mill, a high-speed impeller, a pebble mill, a roller mill, an attritor and a colloid mill. Among these, a media disperser such as sand grinder mill and Dyno-mill is preferred. Also, a preliminary dispersion treatment may be performed. Examples of the disperser for use in the preliminary dispersion treatment include a ball mill, a three-roll mill, a kneader and an extruder.

The electrically conducting material is preferably dispersed in the dispersion medium to have a particle diameter as small as possible. The mass average particle diameter is from 1 to 200 nm, preferably from 5 to 150 nm, more preferably from 10 to 100 nm, still more preferably from 10 to 80 nm. By dispersing the electrically conducting material to have a small particle diameter of 200 nm or less, an antistatic layer not impairing the transparency can be produced.

[Binder]

The antistatic layer for use in the present invention preferably contains an organic compound binder in addition to the electrically conducting material. The electrically conducting material is preferably dispersed after forming the layer matrix by the binder. Accordingly, the antistatic layer is preferably produced by dispersing the electrically conducting material in a dispersion medium, and adding a binder or a binder precursor to the resulting liquid dispersion. As for the binder or binder precursor, for example, a non-curing thermoplastic resin or a curing resin such as thermosetting resin and ionizing radiation-curable resin, may be used.

The softening temperature or glass transition point of the binder or binder precursor is preferably 50° C. or more, more preferably 70° C. or more, still more preferably 100° C. or more.

The crosslinking or polymerizable functional group-containing compound used as a binder precursor in the antistatic layer of the present invention is preferably an ionizing radiation-curable compound, and preferred examples thereof include an ionizing radiation-curable polyfunctional monomer or oligomer described later.

In the Formation Method of Antistatic Layer above, the binder of the antistatic layer is formed as a cured product of a compound having a crosslinking or polymerizable functional group. Simultaneously with or after the coating of the antistatic layer, the binder of the antistatic layer is preferably crosslinked or polymerized with the dispersant, thereby curing and forming the antistatic layer.

The functional group of the ionizing radiation-curable polyfunctional monomer or oligomer is preferably a photopolymerizable functional group, an electron beam-polymerizable functional group or a radiation-polymerizable functional group. Among these, a photopolymerizable functional group is more preferred.

Examples of the photopolymerizable functional group include an unsaturated polymerizable functional group such as (meth)acryloyl group, vinyl group, styryl group and allyl group. Among these, a (meth)acryloyl group is preferred. Specific examples of the photopolymerizable polyfunctional monomer which can be used are the same as those used in the curable composition for the high (medium) refractive index layer, and preferred examples of the monomer are also the same.

As for the photoradical polymerization initiator, the same as that used in the curable composition for the hard coat layer may be used, and examples of the commercially available photoradical polymerization initiator are also the same. Furthermore, similarly, the photoradical polymerization initiator is preferably a photoradical polymerization initiator of photo-cleavage type, and examples of the commercially available photoradical polymerization initiator of photo-cleavage type are also the same.

The photopolymerization initiator is preferably used in an amount of 0.1 to 15 parts by mass, more preferably from 1 to 10 parts by mass, per 100 parts by mass of the polyfunctional monomer.

In addition to the photopolymerization initiator, a photosensitizer may be used. Specific examples of the photosensitizer are the same as those used in the curable composition for the hard coat layer, and examples of the commercially available photosensitizer are also the same.

The photopolymerization reaction is preferably performed by the irradiation of an ultraviolet ray after coating and drying the antistatic layer. For the ultraviolet irradiation, an ultraviolet ray emitted from a light beam of an ultrahigh-pressure mercury lamp, a high-pressure mercury lamp, a low-pressure mercury lamp, a carbon arc lamp, a xenon arc lamp, a metal halide lamp or the like, may be utilized.

In the crosslinked or polymerized binder of the antistatic layer, the main chain of the polymer preferably has a crosslinked or polymerized structure. Examples of the main chain of the polymer include a polyolefin (saturated hydrocarbon), a polyether, a polyurea, a polyurethane, a polyester, a polyamine, a polyamide and a melamine resin. A polyolefin main chain, a polyether main chain and a polyurea main chain are preferred, a polyolefin main chain and a polyether main chain are more preferred, and a polyolefin main chain is most preferred.

The anionic group is preferably bonded to the main chain through a linking group and present as a side chain of the binder.

The linking group of connecting the anionic group and the main chain of the binder is preferably a divalent group selected from —CO—, —O—, an alkylene group, an arylene group and a combination thereof. The crosslinked or polymerized structure is formed by chemically bonding (preferably covalently bonding) two or more main chains, preferably by covalently bonding three or more main chains. The crosslinked or polymerized structure preferably comprises a divalent or higher polyvalent group selected from —CO—, —O—, —S—, a nitrogen atom, a phosphorus atom, an aliphatic residue, an aromatic residue and a combination thereof.

The binder is preferably a copolymer comprising a repeating unit having an anionic group and a repeating unit having a crosslinked or polymerized structure.

In the copolymer, the proportion of the repeating unit having an anionic group is preferably from 2 to 96 mol %, more preferably from 4 to 94 mol %, and most preferably from 6 to 92 mol %. The repeating unit may have two or more anionic groups.

In the copolymer, the proportion of the repeating unit having a crosslinked or polymerized structure is preferably from 4 to 98 mol %, more preferably from 6 to 96 mol %, and most preferably from 8 to 94 mol %.

The repeating unit in the binder may have both an anionic group and a crosslinked or polymerized structure. Also, another repeating unit (a repeating unit having neither an anionic group nor a crosslinked or polymerized structure) may be contained in the binder.

The crosslinked or polymerized binder is preferably produced by coating a coating solution for the formation of the antistatic layer on a transparent support and simultaneously with or after the coating, causing a crosslinking or polymerization reaction.

In the antistatic layer, the electrically conducting material is preferably dispersed to have a particle diameter as small as possible. The mass average particle diameter is generally from 1 to 200 nm, preferably from 5 to 150 nm, more preferably from 10 to 100 nm, and most preferably from 10 to 80 nm. By dispersing the electrically conducting material to have a small particle diameter of 200 nm or less, an antistatic layer not impairing the transparency can be produced.

The content of the electrically conducting material in the antistatic layer is preferably from 30 to 90 mass %, more preferably from 40 to 80 mass %, still more preferably from 50 to 75 mass %, based on the mass of the antistatic layer. In the antistatic layer, two or more kinds of electrically conducting materials may used in combination.

Preferred examples of the coating solvent for the antistatic layer include ketones (e.g., acetone, methyl ethyl ketone, methyl isobutyl ketone, cyclohexanone), esters (e.g., methyl acetate, butyl acetate), ethers (e.g., tetrahydrofuran, 1,4-dioxane), alcohols (e.g., methanol, ethanol, isopropyl alcohol, butanol, ethylene glycol), aromatic hydrocarbons (e.g., toluene, xylene), and water. Among these coating solvents, ketones, aromatic hydrocarbons and esters are preferred, and ketones are most preferred. Among the ketones, methyl ethyl ketone, methyl isobutyl ketone and cyclohexanone are preferred.

The coating solvent may contain other solvent, and examples thereof include an aliphatic hydrocarbon (e.g., hexane, cyclohexane), a halogenated hydrocarbon (e.g., methylene chloride, chloroform, carbon tetrachloride), an amide (e.g., dimethylformamide, dimethylacetamide, n-methylpyrrolidone), an ether (e.g., diethyl ether, dioxane, tetrahydrofuran) and an ether alcohol (e.g., 1-methoxy-2-propanol).

As for the coating solvent, the content of the ketone-based solvent preferably occupies 10 mass % or more, more preferably 30 mass % or more, still more preferably 60 mass % or more, of all solvents contained in the coating solution.

The formation of the antistatic layer is preferably performed in an atmosphere having an oxygen concentration of 4 vol % or less particularly in the case of forming the antistatic layer by a crosslinking or polymerization reaction of an ionizing radiation-curable compound. By producing the antistatic layer in an atmosphere having an oxygen concentration of 4 vol % or less, the physical strength (e.g., scratch resistance), chemical resistance and weather resistance of the antistatic layer and the adhesive property of the antistatic layer to a layer adjacent to the antistatic layer can be enhanced. The oxygen content in an atmosphere for producing the antistatic layer by a crosslinking or polymerization reaction of an ionizing radiation-curable compound is more preferably 3 vol % or less, still more preferably 2 vol % or less, yet still more preferably 1 vol % or less, and most preferably 0.5 vol % or less.

For adjusting the oxygen concentration to 4 vol % or less, this is preferably achieved by displacing the air (nitrogen concentration: about 79 vol %, oxygen concentration: about 21 vol %) with another gas, more preferably with nitrogen (nitrogen purging).

The thickness of the antistatic layer may be appropriately designed according to usage. In the case of producing an antistatic layer having excellent transparency, the thickness is preferably 1 μm or less, more preferably 500 nm or less, still more preferably 200 nm or less, yet still more preferably 150 nm or less. Also, when the antistatic layer is subjected to a hard coat treatment to serve also as a hard coat layer, the thickness is preferably from 1 to 10 μm, more preferably from 2 to 7 μm, still more preferably from 3 to 5 μm.

The haze of the antistatic layer is preferably lower, specifically, 5% or less, more preferably 3% or less, still more preferably 1% or less.

The hardness of the antistatic layer is preferably H or more, more preferably 2H or more, and most preferably 3H or more, in the pencil hardness test according to JIS K-5400.

Furthermore, in the Taber test according to JIS K-5400, the abrasion loss of the specimen between before and after the test is preferably smaller. Therefore, it is also preferred that the antistatic layer is subjected to a hard coat treatment.

The antistatic layer may contain, in addition to the above-described components (e.g., electrically conducting material, polymerization initiator, photosensitizer, binder), a resin, a surfactant, a coupling agent, a thickener, a coloration inhibitor, a colorant (e.g., pigment, dye), a defoaming agent, a leveling agent, a flame retardant, an ultraviolet absorbent, an infrared absorbent, an adhesion-imparting agent, a polymerization inhibitor, an antioxidant, a surface modifier and the like.

[Interference Fringe-Preventing Layer]

In the case where the difference in the refractive index between the transparent support and the antiglare layer (or hard coat layer) is 0.03 or more, an interference fringe (also called an interference stripe, rainbow unevenness or the like) may be sometimes observed under a three-wavelength fluorescent lamp. Such an interference fringe can be eliminated by forming an interference fringe-preventing layer having an intermediate refractive index and having a thickness, in terms of optical thickness, of around 546 nm×¼ between the transparent support and the antiglare layer (or hard coat layer), thereby reducing the reflection at the interface between the transparent support and the antiglare layer (or hard coat layer) based on the thin-film interference principle. Such an interference fringe-preventing layer is described in detail in JP-A-2004-34533, and the interference fringe-preventing layer described therein can be used also in the present invention.

<Antireflection Film>
[Transparent Support]

The antireflection film of the present invention is produced by forming respective layers including an optical functional layer on a transparent support. The light transmittance of the transparent support is preferably 80% or more, more preferably 86% or more. The haze of the transparent support is preferably 2.0% or less, more preferably 1.0% or less. The refractive index of the transparent support is preferably from 1.4 to 1.7.

As for the transparent support, a plastic film is more preferred than a glass plate. Examples of the material for the plastic film include a cellulose ester, a polyamide, a polycarbonate, a polyester (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), a polystyrene (e.g., syndiotactic polystyrene), a polyolefin (e.g., polypropylene, polyethylene, polymethylpentene), a polysulfone, a polyethersulfone, a polyarylate, a polyetherimide, a polymethyl methacrylate and a polyether ketone. Among these, a cellulose ester, a polycarbonate, a polyethylene terephthalate and a polyethylene naphthalate are preferred.

[Cellulose Acylate Film]

Particularly, in the case of using the antireflection film of the present invention for a liquid crystal display device, a cellulose acylate film is preferred. The cellulose acylate is produced by esterifying a cellulose. As for the cellulose before esterification, linter, kenaf or pulp is purified and used.

(Cellulose Acylate)

The cellulose acylate as used in the present invention means a fatty acid ester of cellulose, but a lower fatty acid ester is preferred. Furthermore, a fatty acid ester film of cellulose is preferred.

The lower fatty acid means a fatty acid having 6 or less carbon atoms. A cellulose acylate having from 2 to 4 carbon atoms is preferred. In particular, a cellulose acetate is preferred. It is also preferred to use a mixed fatty acid ester such as cellulose acetate propionate and cellulose acetate butyrate.

The viscosity average degree of polymerization (Dp) of the cellulose acylate is preferably 250 or more, more preferably 290 or more. Also, the cellulose acylate preferably has a narrow molecular weight distribution indexed by Mw/Mn (Mw: mass average molecular weight, Mn: number average molecular weight) according to gel permeation chromatography. Specifically, the Mw/Mn value is preferably from 1.0 to 5.0, more preferably from 1.0 to 3.0, still more preferably from 1.0 to 2.0.

A cellulose acylate having an acetylation degree of 55.0 to 62.5% is preferably used as the transparent support. The acetylation degree is more preferably from 57.0 to 62.0%, still more preferably 59.0 to 61.5%. The acetylation degree means the amount of acetic acid bonded per unit mass of cellulose. The acetylation degree can be determined according to the measurement and calculation of acetylation degree in ASTM:D-817-91 (Test Method of Cellulose Acetate, etc.).

In the cellulose acylate, the hydroxyl group is not equally distributed to the 2-, 3- and 6-positions of cellulose, but the substitution degree at the 6-position tends to become small. In the cellulose acylate for use in present invention, the substitution degree at the 6-position of cellulose is preferably equal to or larger than that at the 2- or 3-position. The proportion of the acetylation degree at the 6-position is preferably from 30 to 40%, more preferably from 31 to 40%, and most preferably from 32 to 40%, based on the total of the substitution degrees at the 2-position, 3-position and 6-position.

For the purpose of adjusting the properties of the film, such as mechanical property (e.g., film strength, curl, dimensional stability, slipperiness) and durability (e.g., moisture and heat resistance, weather resistance), various additives may be used for the transparent support. Examples of the additive include a plasticizer (e.g., phosphoric acid esters, phthalic acid esters, esters of polyol and fatty acid), an ultraviolet inhibitor (e.g., hydroxybenzophenone-based compound, benzotriazole-based compound, salicylic acid ester-based compound, cyanoacrylate-based compound), a deterioration inhibitor (e.g., antioxidant, peroxide decomposing agent, radical inhibitor, metal inactivating agent, acid scavenger, amine), a fine particle (e.g., $SiO_2$, $Al_2O_3$, $TiO_2$, $BaSO_4$, $CaCO_3$, $MgCO_3$, talc, kaolin), a release agent, an antistatic agent and an infrared absorbent.

These additives are described in detail in *JIII Journal of Technical Disclosure*, No. 2001-1745, pp. 17-22, Japan Institute of Invention and Innovation (Mar. 15, 2001).

The amount of such an additive used is preferably from 0.01 to 20 mass %, more preferably from 0.05 to 10 mass %, based on the transparent support.

[Surface Treatment]

The transparent support may be subjected to a surface treatment.

Examples of the surface treatment include a chemical treatment, a mechanical treatment, a corona discharge treatment, a flame treatment, a UV radiation treatment, a high-frequency treatment, a glow discharge treatment, an active plasma treatment, a laser treatment, a mixed acid treatment and an ozone oxidation treatment. Specific examples thereof include the contents described in *JIII Journal of Technical Disclosure*, No. 2001-1745, pp. 30-31 (Mar. 15, 2001) and JP-A-2001-9973. Among these treatments, a glow discharge treatment, a UV radiation treatment, a corona discharge treatment and a flame treatment are preferred, and a glow discharge treatment and an ultraviolet treatment are more preferred.

[Formation Method of Antireflection Film]

The method for forming the antireflection film of the present invention is described below.

Each layer of the antireflection film can be formed by the coating using a coating system such as dip coating method, air knife coating method, curtain coating method, roller coating method, die coating method, wire bar coating method and gravure coating method. Among these coating systems, a gravure coating method is preferred, because a coating solution in a small coated amount as in each layer of the antireflection film can be coated with high film thickness uniformity. As for the gravure coating method, a microgravure coating method is more preferred because of high film thickness uniformity. Furthermore, a coating solution in a small coated amount can be coated with high film thickness uniformity also by a die coating method. The die coating method is a pre-measuring system and therefore, is advantageous in that the control of the film thickness is relatively easy and the transpiration of the solvent in the coated part less occurs. Two or more layers may be coated simultaneously. The simultaneous coating method is described in U.S. Pat. Nos. 2,761,791, 2,941,898, 3,508,947 and 3,526,528, and Yuji Harasaki, *Coating Kogaku* (*Coating Engineering*), page 253, Asakura Shoten (1973).

Respective layers are formed in the following order. First, a coating solution for the formation of a hard coat layer is coated on a transparent support, dried under heating and then irradiated with light or heated to polymerize the monomer for the formation of a hard coat layer, thereby effecting curing and forming a hard coat layer. Subsequently, coating solutions for the formation of a medium refractive index layer and a high refractive index layer or a low refractive index layer are coated on the hard coat layer in the same manner and then irradiated with light or heated to form a medium refractive index layer and a high refractive index layer or a low refractive index layer. At the formation of the antireflection film of the present invention, the curing by light irradiation (so-called ionizing radiation irradiation) and the curing by heating are preferably effected in combination on forming the same layer (particularly, low refractive index layer).

The thermal curing may be implemented after the curing by light irradiation as described in International Publication 03/27189A, pamphlet, but the thermal curing and the curing by light irradiation may be effected in any order and also, each curing may be performed in plural installments. It is particularly preferred to effect curing by light irradiation after thermal curing.

At the formation of each layer except for the low refractive index layer of the antireflection film of the present invention, the crosslinking or polymerization reaction of an ionizing radiation-curable compound is preferably performed in an atmosphere having an oxygen concentration of 10 vol % or less. By forming each layer in an atmosphere having an oxygen concentration of 10 vol % or less, the physical strength, chemical resistance and weather resistance of each layer and the adhesive property between the high refractive index layer and a layer adjacent to the high refractive index layer can be improved. The oxygen concentration in an atmosphere for performing the crosslinking or polymerization reaction of an ionizing radiation-curable compound is more preferably 6 vol % or less, still more preferably 4 vol % or less, yet still more preferably 2 vol % or less, and most preferably 1 vol % or less.

At the formation of the low refractive index layer of the antireflection film of the present invention, the crosslinking or polymerization reaction of an ionizing radiation-curable compound is preferably performed in an atmosphere having an oxygen concentration of 1 vol % or more. The oxygen concentration is more preferably 3 vol % or more, still more preferably 10 vol % or more, yet still more preferably an oxygen concentration equal to that in an atmospheric pressure without performing control for decreasing the oxygen concentration. In the process of continuously curing the low refractive index layer by the roll-to-roll system, an inert gas such as nitrogen is generally blown to the ionizing radiation irradiating zone so as to decrease the oxygen concentration and therefore, the inert gas must be continuously consumed. When the oxygen concentration controlled is closer to that in an atmospheric pressure, the inert gas consumption can be decreased.

The film transportation rate at the continuous production by the roll-to-roll system is preferably 10 m/min or more, more preferably 20 m/min or more, still more preferably 30 m/min or more. This is because a higher film transportation rate requires a longer heat-treatment zone for the thermal curing and the consumption per unit area increases in the photoradical polymerization, as a result, the production cost rises in any case.

<Polarizing Plate>

The polarizing plate of the present invention preferably uses the antireflection film of the present invention for at least one protective film (protective film for polarizing plate) of a polarizing film. The protective film for polarizing plate preferably has, as described above, a contact angle with water of 10 to 50° on the transparent support surface opposite the side having the antiglare layer or antireflection layer, that is, the surface to be laminated with the polarizing film.

By virtue of using the antireflection film of the present invention as the protective film for polarizing plate, a polarizing plate having physical strength and antireflection function can be produced, and great cost reduction and thinning of a display device can be achieved. Also, by using an antireflection film having a light scattering function or an antireflection film having laminated thereon a light-scattering film, a polarizing plate having not only physical strength and antireflection function but also excellent light resistance and light-scattering function can be produced.

Furthermore, when the polarizing plate is produced by using the antireflection film of the present invention as one protective film for polarizing plate and using an optical compensation film having an optically anisotropic property as another protective film of the polarizing film, a polarizing plate capable of giving a liquid crystal display device improved in the visibility and contrast in a bright room and assured of remarkably enlarged viewing angle in the up, down, right and left directions can be produced.

[Optical Compensation Layer]

The viewing angle properties of a liquid crystal display screen can be improved by providing an optical compensation layer (retardation layer) in the polarizing plate.

As for the optical compensation layer, a known optical compensation layer may be used but from the standpoint of enlarging the viewing angle, an optical compensation layer where a layer comprising a compound having a discotic structural unit is provided and the angle made by the discotic compound and the transparent support is changing along with increase in the distance from the transparent support, is preferred. This angle is preferably increased along with the increase in the distance from the transparent support surface side of the optically anisotropic layer comprising a discotic compound.

In the case of using an optical compensation layer as the protective film of a polarizing film, the surface on the side to be laminated with a polarizing film is preferably saponified, and the saponification is preferably performed according to the above-described saponification treatment.

[Polarizing Film]

As for the polarizing film, a known polarizing film may be used, but a polarizing film cut out from a lengthy polarizing film with the absorption axis of the polarizing film being neither parallel nor perpendicular to the longitudinal direction may also be used. The lengthy polarizing film with the absorption axis of the polarizing film being neither parallel nor perpendicular to the longitudinal direction is produced by the following method.

This polarizing film can be produced by continuously feeding a polymer film and stretching the film while holding both edges of the film with holding means and applying a tension according to a stretching method where the film is stretched at a drawing ratio of 1.1 to 20.0 at least in the cross direction, the holding devices at both edges of the film are moved to create a difference in the travelling speed of 3% or less in the longitudinal direction, and the film travelling direction is bent in the state of the film being held at both edges such that the angle made by the film travelling direction at the outlet in the step of holding both edges of the film and the substantial stretching direction of the film is inclined at 20 to 70°. Particularly, a polarizing film produced with an inclination angle of 45° is preferred in view of productivity.

The stretching method of a polymer film is described in detail in JP-A-2002-86554 (paragraphs [0020] to [0030]).

<Image Display Device>

The image display device of the present invention is characterized in that at least either one of the above-described antireflection film and polarizing plate (polarizing plate with antireflection ability) is disposed on the image display surface. The antireflection film and polarizing plate of the present invention can be applied to an image display device such as liquid crystal display device (LCD) and organic EL display. The image display device of the present invention is preferably a TN-mode, STN-mode, IPS-mode, VA-mode or OCB-mode transmissive, reflective or transflective liquid crystal display device. This is described below.

[Liquid Crystal Display Device]

As for the liquid crystal display, any conventionally known liquid crystal display device can be used. Examples thereof include those described in Tatsuo Uchida (supervisor), *Hansha-gata Color LCD Sogo Gijutsu* (*General Technique of Reflection-Type Color LCD*), {CMC (1999)}, *Flat Panel Display no Shin Tenkai* (*New Prospect of Flat Panel Display*), {Research Division of Toray Research Center (1996)}, and *Ekisho Kanren Shijo no Genjo to Shorai Tenbo* (*Jokan*), (*Gekan*) (*Status Qua and Future Prospect of Liquid Crystal-Related Market*) (*first volume*), (*last volume*)), {Fuji Chimera Soken (2003)}.

Specifically, the antireflection film or polarizing plate of the present invention is preferably used, for example, in a transmissive, reflective or transflective liquid crystal display device of a mode such as twisted nematic (TN) mode, super-twisted nematic (STN) mode, vertical alignment (VA) mode, in-plane switching (IPS) mode and optically compensated bend cell (OCB) mode.

The polarizing plate of the present invention is advantageous in that good contrast and wide viewing angle are realized even when the image size of a liquid crystal display device to which the polarizing plate is applied is 17 inches or more, change of color hue and projection of outside light can be prevented, and good durability is ensured.

[TN-Mode Liquid Crystal Display Device]

The TN-mode liquid crystal cell is most frequently utilized as a color TFT liquid crystal display device and described in a large number of publications. The alignment state in the liquid crystal cell at the T-mode black display is such that the rod-like liquid crystalline molecules are standing in the center part of the cell and lying down in the vicinity of the cell substrate.

[OCB-Mode Liquid Crystal Display Device]

The OCB-mode liquid crystal cell is a liquid crystal cell in a bend alignment mode where rod-like liquid crystalline molecules are aligned substantially in the reverse directions (symmetrically) between the upper and lower parts of the liquid crystal cell. The liquid crystal display device using a bend alignment mode is disclosed in U.S. Pat. Nos. 4,583,825 and 5,410,422. Since rod-like liquid crystalline molecules are aligned symmetrically between the upper and lower parts of the liquid crystal cell, the liquid crystal cell of this bend alignment mode has a function of self-optical compensation. Therefore, this liquid crystal mode is also called an OCB (optically compensatory bend) liquid crystal mode.

Similarly to the TN-mode, the OCB-mode liquid crystal cell also has an alignment state in the liquid crystal cell such that at the black display, the rod-like liquid crystalline molecules are standing in the center part of the cell and lying down in the vicinity of the cell substrate.

[VA-Mode Liquid Crystal Display Device]

In the VA-mode liquid crystal cell, rod-like liquid crystalline molecules are oriented substantially in the vertical alignment at the time of not applying a voltage.

The VA-mode liquid crystal cell includes:

(1) a VA-mode liquid crystal cell in a narrow sense where rod-like liquid crystalline molecules are oriented substantially in the vertical alignment at the time of not applying a voltage and oriented substantially in the horizontal alignment at the time of applying a voltage (described in JP-A-2-176625);

(2) a (MVA-mode) liquid crystal cell where the VA mode is modified to a multi-domain system for enlarging the viewing angle {described in *SID97, Digest of Tech. Papers* (preprints), 28, 845 (1997)};

(3) a (n-ASM-mode) liquid crystal cell where rod-like liquid crystalline molecules are oriented substantially in the vertical alignment at the time of not applying a voltage and oriented in the twisted multi-domain alignment at the time of applying a voltage [described in preprints of Nippon Ekisho Toronkai (Liquid Crystal Forum of Japan), 58-59 (1998)); and (4) a SURVAIVAL-mode liquid crystal cell (reported in LCD International 98).

[IPS-Mode Liquid Crystal Display Device]

In the IPS-mode liquid crystal cell, liquid crystal molecules are in a mode of being always rotated in the horizontal plane with respect to the substrate, and aligned to make a slight angle with the longitudinal direction of the electrode at the time of not applying a voltage. When an electric field is applied, the liquid crystal molecules change the direction. The light transmittance can be varied by disposing the polarizing plates having interposed therebetween a liquid crystal cell to lie at a predetermined angle.

As for the liquid crystal molecule, a nematic liquid crystal having positive dielectric anisotropy $\Delta\epsilon$ is used. The thickness (gap) of the liquid crystal cell is adjusted to a range from more than 2.8 µm to less than 4.5 µm, because when the retardation $\Delta n \cdot d$ is from more than 0.25 µm to less than 0.32 µm, transmittance characteristics almost free of wavelength dependency in the visible light range can be obtained. By selecting the combination of polarizing plates, a maximum transmittance can be obtained when the liquid crystal molecules are rotated 45° from the rubbing direction to the electric field direction. Incidentally, the thickness (gap) of the liquid crystal layer is controlled by a polymer bead. The same gap can be of course obtained by using a glass fiber or a columnar spacer made of fiber or resin. The liquid crystal molecule is not particularly limited as long as it is a nematic liquid crystal. With a larger dielectric anisotropy $\Delta\epsilon$, the driving voltage can be decreased. Also, with a smaller refractive index anisotropy $\Delta n$, the thickness (gap) of the liquid crystal layer can be increased, the liquid crystal encapsulating time can be shortened, and the fluctuation in the gap can be reduced.

[Other Liquid Crystal Modes]

For the ECB-mode and STN-mode liquid crystal display devices, the polarizing plate of the present invention can be used in the same way of thinking as above.

[Fabrication of Liquid Crystal Display Device]

The liquid crystal display device can be fabricated according to a conventional technique. That is, the liquid crystal display device is generally fabricated, for example, by appropriately combining a liquid crystal cell, an optical film such as antireflection film and optical compensation film, a polarizing plate and if desired, a component such as lighting system, and incorporating a drying circuit. In the present invention, the fabrication of the liquid crystal display device is not particularly limited except for using the antireflection film or polarizing plate of the present invention and may follow conventional techniques.

At the fabrication of the liquid crystal display device, for example, an appropriate component such as prism array, lens array, light scattering plate, light guide plate and backlight can be disposed at an appropriate position in the form of a single layer or two or more layers. Furthermore, when combined with a λ/4 plate, the antireflection film or polarizing plate of the present invention can be used as a polarizing plate for a reflective liquid crystal display device or a protective film for an organic EL display so as to reduce the reflected light from the surface and the inside.

EXAMPLES

The present invention is described below in greater detail by referring to Examples, but the present invention is not limited thereto. Unless otherwise indicated, the "parts" and "%" are on the mass basis.

Example 1

<Curable Composition>

Synthesis Example 1

Synthesis of Perfluoroolefin Copolymer (1)

Ethyl acetate (40 ml), 14.7 g of hydroxyethyl vinyl ether and 0.55 g of dilauryol peroxide were charged into a stainless steel-made autoclave with a stirrer having an internal volume of 100 ml, and the system was evacuated and purged with a nitrogen gas. Furthermore, 25 g of hexafluoropropylene (HFP) was introduced into the autoclave and the system was heated to 65° C. The pressure when the temperature in the autoclave reached 65° was 5.4 kg/Cm². The reaction was continued for 8 hours while keeping the temperature and when the pressure reached 3.2 kg/cm², the heating was stopped and the system was allowed to cool. At the time where the inner temperature dropped to room temperature, the unreacted monomer was expelled and after opening the autoclave, the reaction solution was taken out. The reaction solution obtained was poured in a large excess of hexane and the precipitated polymer was taken out by removing the solvent by means of decantation. This polymer was dissolved in a small amount of ethyl acetate, and reprecipitation from hexane was performed twice to completely remove the residual monomer. After drying, 28 g of a 1:1 copolymer of hexafluoropropylene and hydroxyethylvinyl ether was obtained. The refractive index of the obtained polymer was 1.406. Subsequently, 20 g of this polymer was dissolved in 100 ml of N,N-dimethylacetamide, and 4.6 g of acrylic acid chloride was added thereto under ice cooling, followed by stirring at room temperature for 10 hours. After adding ethyl acetate thereto, the reaction solution was washed with water, and the organic layer was extracted and then concentrated. The obtained polymer was reprecipitated with hexane to obtain 15 g of Fluorine-Containing Copolymer (P-1). The number average molecular weight of the obtained polymer was 29,000, and the refractive index was 1.415.

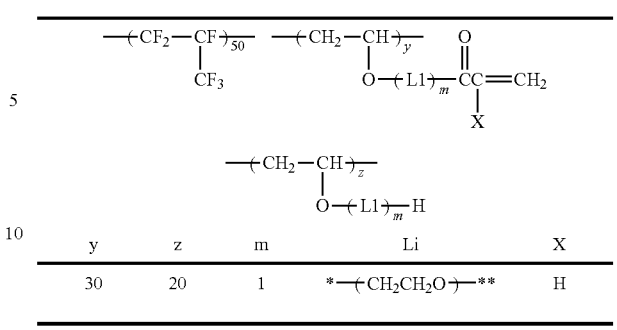

*denotes the polymer main chain.
**denotes the (meth)acryloyl group side.

Synthesis Example 2

Synthesis of Perfluoroolefin Copolymer (2)

Ethyl acetate (25 ml), 2.07 g of ethyl vinyl ether, 5.61 g of 2-glycidyloxyethyl vinyl ether and 0.23 g of dilauryol peroxide were charged into a stainless steel-made autoclave (manufactured by Taiatsu Techno Corporation) with a stirrer having an internal volume of 100 ml, and the system was evacuated and purged with a nitrogen gas. Furthermore, 10.77 g of hexafluoropropylene (HFP) was introduced into the autoclave and the system was heated to 65° C. The pressure when the temperature in the autoclave reached 65° C. was 5.1 kg/cm². The stirring was continued for 8 hours while keeping the temperature and when the pressure reached 2.8 kg/cm², the heating was stopped and the system was allowed to cool. At the time where the inner temperature dropped to room temperature, the unreacted monomer was expelled and after opening the autoclave, the reaction solution was taken out. After concentrating the reaction solution, the polymer obtained was dissolved in a small amount of ethyl acetate and reprecipitated from n-hexane. Reprecipitation of the obtained polymer from n-hexane was further performed twice to completely remove the residual monomer. The resulting polymer was dried under reduced pressure, as a result, 13 g of Fluorine-Containing Polymer P-28 was obtained. The number average molecular weight of the obtained polymer was 31,000, and the refractive index was 1.407.

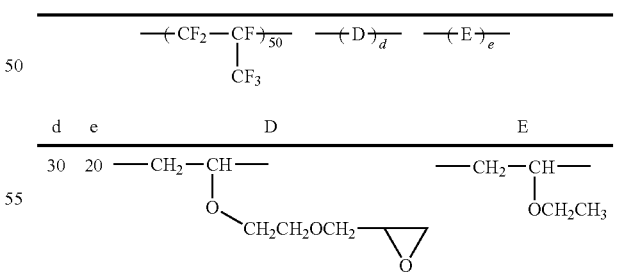

[Preparation of Sol Solution a]

In a reactor equipped with a stirrer and a reflux condenser, 120 parts of methyl ethyl ketone, 100 parts of acryloyloxypropyltrimethoxysilane "KBM-5103" {produced by Shin-Etsu Chemical Co., Ltd.} and 3 parts of diisopropoxyaluminum ethyl acetoacetate "Kerope EP-12" {produced by Hope Chemical Co., Ltd.} were added and mixed and after adding thereto 30 parts of ion-exchanged water, the mixture was allowed to react at 60° C. for 4 hours. Thereafter, the reaction mixture was cooled to room temperature to obtain Sol Solution a. The mass average molecular weight was 1,600 and out of the oligomer or greater polymer components, the component having a molecular weight of 1,000 to 20,000 occupied 100%. Also, the gas chromatography revealed that the raw material acryloyloxypropyltrimethoxysilane was not remaining at all. Sol Solution a was adjusted to a solid content concentration of 29% by methyl ethyl ketone.

[Preparation of Sol Solution b]

Sol Solution b was obtained by the same operation as in Preparation of Sol Solution a except for changing acryloyloxypropyltrimethoxysilane "YKBM-5103" {produced by Shin-Etsu Chemical Co., Ltd.) to glycidoxypropyltrimethoxysilane "KBM-403 {produced by Shin-Etsu Chemical Co., Ltd.}.

[Preparation of Coating Solutions (HCL-1) to (HCL-5) for Hard Coat Layer]

{Composition of Coating Solution (HCL-1) for Hard Coat Layer}

| | |
|---|---|
| Zirconia fine particle-containing hard coat composition "Desolite Z-7404" {particle diameter: 20 nm, produced by JSR Corp.} | 102 parts |
| UV-Curable resin "DPHA" {produced by Nippon Kayaku Co., Ltd.} | 29 parts |
| Silane coupling agent "KBM-5103" {produced by Shin-Etsu Chemical Co., Ltd.} | 10 parts |
| Silica particle "KE-P150" {1.5 μm, produced by Nippon Shokubai Co., Ltd.} | 8.9 parts |
| Crosslinked PMMA particle "MXS-300" {3 μm, produced by The Soken Chemical & Engineering Co., Ltd.} | 3.4 parts |
| Methyl ethyl ketone (MEK) | 29 parts |
| Methyl isobutyl ketone (MIBK) | 13 parts |

{Composition of Coating Solution (HCL-2) for Hard Coat Layer}

| | |
|---|---|
| Trimethylolpropane triacrylate "TMPTA" {produced by Nippon Kayaku Co., Ltd.} | 740.0 parts |
| Poly(glycidyl methacrylate) (mass average molecular weight: 15,000) | 280.0 parts |
| MEK | 730.0 parts |
| Cyclohexanone | 500.0 parts |
| Photopolymerization initiator "Irgacure 184" {produced by Ciba Specialty Chemicals} | 50.0 parts |
| Photo-cationic polymerization initiator "Rhodosil 2074" {produced by Rhodia} | 25.0 parts |

{Composition of Coating Solution (HCL-3) for Hard Coat Layer}

| | |
|---|---|
| UV-Curable resin "PETA" {produced by Nippon Kayaku Co., Ltd.} | 500.0 parts |
| "Irgacure 184" | 20.0 parts |
| Toluene liquid dispersion of crosslinked polystyrene particle (30%) | 17.0 parts |
| Toluene liquid dispersion of crosslinked acryl-styrene particle (30%) | 133.0 parts |
| FP-1 | 0.3 parts |
| KBM-5103 | 100.0 parts |
| Toluene | 385.0 parts |

{Composition of Coating Solution (HCL-4) for Hard Coat Layer}

| | |
|---|---|
| Silica fine particle-containing hard coat composition, a product modified in the solvent composition of "Desolite 7526" {produced by JSR Corp.} | 272.0 parts |
| MIBK Liquid dispersion of 3.5-μm crosslinked polystyrene particle (25%) | 44.0 parts |
| MIBK Liquid dispersion of 5.0-μm crosslinked polystyrene particle (25%) | 57.8 parts |
| Methyl isobutyl ketone | 26.2 parts |
| Methyl ethyl ketone | 48.0 parts |

{Composition of Coating Solution (HCL-5) for Hard Coat Layer}

| | |
|---|---|
| Silica fine particle-containing hard coat composition, a product modified in the solvent composition of "Desolite 7526" {produced by JSR Corp.} | 245.0 parts |
| Sol Solution b | 67.6 parts |
| MIBK Liquid dispersion of 3.5-μm crosslinked polystyrene particle (25%) | 44.0 parts |
| MIBK Liquid dispersion of 5.0-μm crosslinked polystyrene particle (25%) | 57.8 parts |
| Methyl isobutyl ketone | 26.2 parts |

These coating solutions each was filtered through a polypropylene-made filter having a pore size of 30 μm for (HCL-1) and (HCL-3) to (HCL-3) and a pore size of 0.4 μm for (HCL-2) to complete the coating solution for hard coat layer.

[Preparation of Liquid Dispersion of Titanium Dioxide Fine Particle]

As for the titanium dioxide fine particle, a titanium dioxide fine particle "MPT-129C" containing cobalt and surface-treated by using aluminum hydroxide and zirconium hydroxide {produced by Ishihara Sangyo Kaisha, Ltd., $TiO_2:Co_3O_4:Al_2O_3:ZrO_2=90.5:3.0:4.0:0.5$ (by mass)} was used.

To 257.1 parts of this fine particle, 41.1 parts of a dispersant shown below and 701.8 parts of cyclohexanone were added and dispersed by a Dyno-mill to prepare a liquid dispersion of titanium dioxide having a mass average diameter of 70 nm.

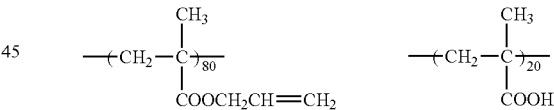

[Preparation of Coating Solution (MLL-1) for Medium Refractive Index Layer]

The following composition was thoroughly stirred and then filtered through a polypropylene-made filter having a pore size of 0.4 μm.

{Composition of Coating Solution (MLL-1) for Medium Refractive Index Layer}

| | |
|---|---|
| Liquid dispersion of titanium dioxide | 99.1 parts |
| UV-Curable resin "DPHA" {produced by Nippon Kayaku Co., Ltd.} | 68.0 parts |
| Photopolymerization initiator "Irgacure 907" {produced by iba Specialty Chemicals} | 3.6 parts |
| Photosensitizer "Kayacure DETX" {produced by Nippon Kayaku Co., Ltd.} | 1.2 parts |
| MEK | 279.6 parts |
| Cyclohexanone | 1049.0 parts |

{Preparation of Coating Solutions (HLL-1) and (HLL-2) for High Refractive Index Layer]

The following composition was thoroughly stirred and then filtered through a polypropylene-made filter having a pore size of 0.4 μm.

| {Composition of Coating Solution (HLL-1) for High Refractive Index Layer} | |
|---|---|
| Liquid dispersion of titanium dioxide | 469.8 parts |
| UV-Curable resin "DPHA" {produced by Nippon Kayaku Co., Ltd.} | 40.0 parts |
| Photopolymerization initiator "Irgacure 907" {produced by Ciba Specialty Chemicals} | 3.3 parts |
| Photosensitizer "Kayacure DETX" {produced by Nippon Kayaku Co., Ltd.} | 1.1 parts |
| MEK | 526.2 parts |
| Cyclohexanone | 459.6 parts |

| {Composition of Coating Solution (HLL-2) for High Refractive Index Layer} | |
|---|---|
| Liquid dispersion of titanium dioxide | 469.8 parts |
| UV-Curable resin "DPHA" {produced by Nippon Kayaku Co., Ltd.} | 36.0 parts |
| Sol Solution a | 13.8 parts |
| Photopolymerization initiator "Irgacure 907" {produced by Ciba Specialty Chemicals} | 3.3 parts |
| Photosensitizer "Kayacure DETX" {produced by Nippon Kayaku Co., Ltd.} | 1.1 parts |
| MEK | 520.6 parts |
| Cyclohexanone | 459.6 parts |

[Preparation of Coating Solutions (LLL-1) to (LLL-8) for Low Refractive Index Layer]

The following compositions each was stirred and then filtered through a polypropylene-made filter having a pore size of 1 μm to prepare each coating solution for low refractive index layer.

| {Composition of Coating Solution (LLL-1) for Low Refractive Index Layer} | |
|---|---|
| Perfluoroolefin Copolymer (2) | 47.0 parts |
| "MEK-ST" | 160.0 parts |
| Reactive silicone "X22-169AS" {produced by Shin-Etsu Chemical Co., Ltd.} | 1.4 parts |
| Sol Solution b | 53.0 parts |
| Photo-cationic polymerization initiator "Rhodosil 2074" {produced by Rhodia} | 2.4 parts |
| Cyclohexanone | 156.0 parts |
| MEK | 1240.0 parts |

| {Composition of Coating Solution (LLL-2) for Low Refractive Index Layer} | |
|---|---|
| Perfluoroolefin Copolymer (2) | 62.4 parts |
| "MEK-ST-L" | 160.0 parts |
| Photo-cationic polymerization initiator "Rhodosil 2074" {produced by Rhodia} | 3.1 parts |
| Cyclohexanone | 156.0 parts |
| MEK | 1277.5 parts |

| {Composition of Coating Solution (LLL-3) for Low Refractive Index Layer} | |
|---|---|
| Perfluoroolefin Copolymer (2) | 62.4 parts |
| "MEK-ST-L" | 160.0 parts |
| Reactive silicone "X22-169AS" {produced by Shin-Etsu Chemical Co., Ltd.} | 1.4 parts |
| Photo-cationic polymerization initiator "Rhodosil 2074" {produced by Rhodia} | 3.1 parts |
| Cyclohexanone | 156.0 parts |
| MEK | 1277.5 parts |

| {Composition of Coating Solution (LLL-4) for Low Refractive Index Layer} | |
|---|---|
| Perfluoroolefin Copolymer (2) | 47.0 parts |
| "MEK-ST-L" | 160.0 parts |
| Reactive silicone "X22-169AS" {produced by Shin-Etsu Chemical Co., Ltd.} | 1.4 parts |
| Sol Solution b | 53.0 parts |
| Photo-cationic polymerization initiator "Rhodosil 2074" {produced by Rhodia} | 2.4 parts |
| Cyclohexanone | 156.0 parts |
| MEK | 1240.0 parts |

| {Composition of Coating Solution (LLL-5) for Low Refractive Index Layer} | |
|---|---|
| Perfluoroolefin Copolymer (1) | 47.0 parts |
| "Hollow Silica A" (20.0%) | 195.0 parts |
| "MEK-ST-L" | 30.0 parts |
| Reactive silicone "X22-164C" {produced by Shin-Etsu Chemical Co., Ltd.} | 1.4 parts |
| Sol Solution a | 12.65 parts |
| "Irgacure 907" | 2.4 parts |
| Cyclohexanone | 156.0 parts |
| MEK | 1223.0 parts |

| {Composition of Coating Solution (LLL-6) for Low Refractive Index Layer} | |
|---|---|
| Perfluoroolefin Copolymer (2) | 47.0 parts |
| "Hollow Silica B" (20.0%) | 195.0 parts |
| "MEK-ST-L" | 30.0 parts |
| Reactive silicone "X22-169AS" {produced by Shin-Etsu Chemical Co., Ltd.} | 1.4 parts |
| Sol Solution b | 12.65 parts |
| Photo-cationic polymerization initiator "Rhodosil 2074" {produced by Rhodia} | 2.4 parts |
| Cyclohexanone | 156.0 parts |
| MEK | 1223.0 parts |

| {Composition of Coating Solution (LLL-7) for Low Refractive Index Layer} | |
|---|---|
| Perfluoroolefin Copolymer (2) | 37.6 parts |
| Curing Agent A-14 (3,4-epoxycyclohexylmethyl-3',4'-epoxycyclohexane carboxylate) | 9.4 parts |
| "Hollow Silica B" (20.0%) | 195.0 parts |
| "MEK-ST-L" | 30.0 parts |
| Reactive silicone "X22-169AS" {produced by Shin-Etsu Chemical Co., Ltd.} | 1.4 parts |
| Sol Solution b | 12.65 parts |

{Composition of Coating Solution (LLL-7) for Low Refractive Index Layer}

| | |
|---|---|
| Photo-cationic polymerization initiator "Rhodosil 2074" {produced by Rhodia} | 2.4 parts |
| Cyclohexanone | 156.0 parts |
| MEK | 1223.0 parts |

{Composition of Coating Solution (LLL-8) for Low Refractive Index Layer}

| | |
|---|---|
| Perfluoroolefin Copolymer (2) | 47.0 parts |
| "Porous Silica Liquid Dispersion" (30%) | 160.0 parts |
| Reactive silicone "X22-169AS" {produced by Shin-Etsu Chemical Co., Ltd.} | 1.4 parts |
| Sol Solution b | 53.0 parts |
| Photo-cationic polymerization initiator "Rhodosil 2074" {produced by Rhodia} | 2.4 parts |
| Cyclohexanone | 156.0 parts |
| MEK | 1240.0 parts |

[Preparation of Coating Solution for Low Refractive Index Layer (LLL-9) to (LLL-12)]

(LLL-9) to (LLL-12) were prepared according to exactly the same manner except for changing "Rhodosil 2074" (photopolymerization initiator of coating solution for low refractive index layer (LLL-1), (LLL-3), (LLL-6) and (LLL-7) to "UVI-6990" manufactured by Union Carbide Corporation.

[Preparation of Coating Solution for Low Refractive Index Layer (LLL-13) to (LLL-16)]

(LLL-13) to (LLL-16) were prepared according to exactly the same manner except for changing "Rhodosil 2074" (photopolymerization initiator of coating solution for low refractive index layer (LLL-1), (LLL-3), (LLL-6) and (LLL-7) to 2-{4-(4-hydroxybenzoylamino)phenyl}-4,6- bis(trichloromethyl)-s-triazine.

The compounds used in the composition of each coating solution for low refractive index layer are shown below.

"Irgacure 184": A photopolymerization initiator {produced by Ciba Specialty Chemicals}.
"Irgacure 907": A photopolymerization initiator {produced by Ciba Specialty Chemicals}.
"Rhodosil 2074": A photo-cationic polymerization initiator {produced by Rhodia}
"UVI-6990": A photo-cationic polymerization initiator manufactured by Union Carbide Corporation
"Toluene liquid dispersion of crosslinked polystyrene particle (30%)":
A 30 mass % toluene liquid dispersion of SX-350H (trade name, crosslinked polystyrene particle having an average particle diameter of 3.5 µm {refractive index: 1.60, produced by The Soken Chemical & Engineering Co., Ltd.}); used after dispersion at 10,000 rpm for 20 minutes by a polytron disperser.
"Toluene Liquid Dispersion of Crosslinked Acryl-styrene Particle (30%)":
A 30 mass % toluene liquid dispersion of SX-350HL (trade name, average particle diameter: 3.5 µm {refractive index: 1.55, produced by The Soken Chemical & Engineering Co., Ltd.}); used after dispersion at 10,000 rpm for 20 minutes by a polytron disperser.
"MIBK Liquid Dispersion of 3.5-µm Crosslinked Polystyrene Particle (25%)":
A 25 mass % methyl isobutyl ketone liquid dispersion of SX-350H (trade name, crosslinked polystyrene particle having an average particle diameter of 3.5 µm {refractive index: 1.60, produced by The Soken Chemical & Engineering Co., Ltd.}); used after dispersion at 10,000 rpm for 20 minutes by a polytron disperser.
"MIBK Liquid Dispersion of 5.0-µm Crosslinked Polystyrene Particle (25%)":
A 25 mass % methyl isobutyl ketone liquid dispersion of SX-500H (trade name, crosslinked polystyrene particle having an average particle diameter of 5.0 µm {refractive index: 1.60, produced by The Soken Chemical & Engineering Co., Ltd.}); used after dispersion at 10,000 rpm for 20 minutes by a polytron disperser.
"FP-1":
A fluorine-based surface modifier.

FP-1:

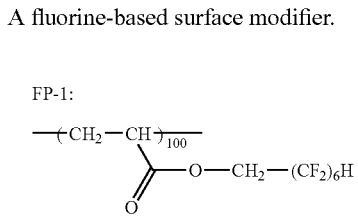

"KBM-5103":
A silane coupling agent (produced by Shin-Etsu Chemical Co., Ltd.). A product modified in the solvent composition of "Desolite 7526":
A produced modified in the solvent composition of a silica-containing hard coat solution UV-curable hard coat solution "Desolite 7526" (trade name, produced by JSR Corp.); solid content concentration: about 72%, silica fine particle content in the solid content: 38%, containing a polymerization initiator.
"JTA113":
"Opstar JTA113 (trade name)", a thermal crosslinking fluorine-containing polymer {refractive index: 1.44, solid content concentration: 6%, produced by JSR Corp.}
"DPHA":
A mixture of dipentaerythritol pentaacrylate and dipentaerythritol hexaacrylate {produced by Nippon Kayaku Co., Ltd.}.
"PETA":
A mixture of pentaerythritol triacrylate and dipentaerythritol tetraacrylate {produced by Nippon Kayaku Co., Ltd.}.
Curing Agent A-14:
Compound A-14 (3,4-epoxycyclohexylmethyl-3',4'-epoxycyclohexane carboxylate) described in [0069] of JP-A-2004-354740.
"MEK-ST":
A silica sol {silica, average particle diameter: 15 nm, solid content concentration: 30%, produced by Nissan Chemicals Industries, Ltd.}
"MEK-ST-L"
A silica sol {silica, a product differing in the particle diameter from MEK-ST, average particle diameter: 45 nm, solid content concentration: 30%, produced by Nissan Chemicals Industries, Ltd.}.
"Hollow Silica A":
A hollow silica sol surface-modified with "KBM-5103" {as for the surface modification ratio based on hollow silica (produced according to Preparation Example 4 of JP-A-2002-79616, average particle diameter: about 40 nm, shell thickness: about 7 nm, refractive index of silica particle: 1.31), out of the solid content concentration of 26 mass %, the solid content concentration ascribable to silica particle was 20 mass % and the solid content concentration ascribable to surface modifier was 6 mass %; the solvent was MEK}.

"Hollow Silica B":

Hollow Silica Particle B was obtained by the same operation as in the preparation of "Hollow Silica A" except for changing "KBM-5103" of "Hollow Silica A" to "KBM-403".

"Liquid Dispersion of Porous Silica" (30%):

A porous silica fine particle (Nipsil SS50F, trade name, produced by Nihon Silica Kogyo K. K., primary particle diameter: 20 nm, refractive index: 1.38, specific surface area: 82 $m^2/g$) was dispersed in MEK to have a solid content concentration of 30 mass %.

"X22-164C":

A modified polydimethylsiloxane having methacryl at both terminals (produced by Shin-Etsu Chemical Co., Ltd.).

"X22-169AS":

A modified polydimethylsiloxane having methacryl at both terminals (produced by Shin-Etsu Chemical Co., Ltd.).

<Production of Antireflection Film>

Example 1-1

[Coating of Hard Coat Layer (HC-1)]

A triacetyl cellulose film, "TD80U" {produced by Fuji Photo Film Co., Ltd.}, in a roll form was unrolled as the support, and Coating Solution (HCL-1) for Hard Coat Layer was coated directly thereon by using a doctor blade and a microgravure roll having a diameter of 50 mm and having a gravure pattern with a line number of 135 lines/inch and a depth of 60 μm under the conditions such that the transportation speed was 10 m/min, and after drying at 60° C. for 150 seconds, irradiated with an ultraviolet ray at an illumination intensity of 400 mW/$cm^2$ and an irradiation dose of 250 mJ/$cm^2$ by using an air-cooled metal halide lamp of 160 W/cm (manufactured by Eyegraphics Co., Ltd.) in an atmosphere adjusted to an oxygen concentration of 1.0 vol % by nitrogen purging, thereby curing the coated layer to form Hard Coat Layer (HC-1). The resulting film was taken up. The rotation number of the gravure roll was adjusted to give a hard coat layer thickness of 3.6 μm after curing.

[Coating of Low Refractive Index Layer (LL-6)]

The triacetyl cellulose film having coated thereon Hard Coat Layer (HC-1) was again unrolled, and Coating Solution (LLL-6) for Low Refractive Index Layer was coated thereon by using a doctor blade and a microgravure roll having a diameter of 50 mm and having a gravure pattern with a line number of 180 lines/inch and a depth of 40 μm under the conditions such that the rotation number of the gravure roll was 30 rpm and the transportation speed was 30 m/min, and after drying at 120° C. for 150 seconds, irradiated with an ultraviolet ray at an illumination intensity of 400 mW/$cm^2$ and an irradiation dose of 900 mJ/$cm^2$ to form Low Refractive Index Layer (LL-6) having a thickness of 100 nm. The resulting film was taken up. In this way, Antireflection Film Sample (101) was produced. Incidentally, the oxygen concentration in the ultraviolet irradiation atmosphere was 20 vol %.

Examples 1-2 to 1-21 and Comparative Examples 1-1 to 1-5

Antireflection Film Samples (102) to (126) each having a constitution shown in Table 1 were produced by changing the coating solution for hard coat layer and the coating solution for low refractive index layer in Example 1-1. Here, Hard Coat Layers (HC-2) to (HC-4) may be formed by changing Coating Solution (HCL-1) for Hard Coat Layer of Example 1-1 to (HCL-2) to (HCL-4), respectively, and Low Refractive Index Layers (LL-1) to (LL-5) or (LL-6) to (LL-16) may be formed by changing Coating Solution (LLL-6) for Low Refractive Index Layer of Example 1-1 to (LLL-1) to (LLL-5) or (LLL-7) to (LLL-16), respectively.

[Coating of Medium Refractive Index Layer (ML-1)]

A triacetyl cellulose film having provided thereon Hard Coat Layer (HC-2) produced in the same manner as in Example 1-2 was again unrolled, and Coating Solution (MLL-1) for Medium Refractive Index Layer was coated thereon by using a doctor blade and a microgravure roll having a diameter of 50 mm and having a gravure pattern with a line number of 180 lines/inch and a depth of 40 μm under the conditions such that the transportation speed was 15 m/min. The drying conditions were set to 90° C. and 30 seconds. As for the ultraviolet curing conditions, an ultraviolet ray was irradiated at an illumination intensity of 400 mW/$cm^2$ and an irradiation dose of 400 mJ/$cm^2$ by using an air-cooled metal halide lamp of 180 W/cm (manufactured by Eyegraphics Co., Ltd.) while purging the system with nitrogen to give an atmosphere having an oxygen concentration of 1.0 vol % or less. Medium Refractive Index Layer (ML-1) was formed to have a thickness of 67 nm after coating by controlling the rotation number of the gravure roll, and the resulting film was taken up. The refractive index of the medium refractive index layer after curing was 1.630.

[Coating of High Refractive Index Layer (HL-1)]

The triacetyl cellulose film having provided thereon up to Medium Refractive Index Layer (ML-1) was again unrolled, and Coating Solution (HLL-1) for High Refractive Index Layer was coated thereon by using a doctor blade and a microgravure roll having a diameter of 50 mm and having a gravure pattern with a line number of 180 lines/inch and a depth of 40 μm under the conditions such that the transportation speed was 15 m/min. The drying conditions were set to 90° C. and 30 seconds. As for the ultraviolet curing conditions, an ultraviolet ray was irradiated at an illumination intensity of 600 mW/$cm^2$ and an irradiation dose of 400 mJ/$cm^2$ by using an air-cooled metal halide lamp of 240 W/cm (manufactured by Eyegraphics Co., Ltd.) while purging the system with nitrogen to give an atmosphere having an oxygen concentration of 1.0 vol % or less. High Refractive Index Layer (HL-1) or (HL-2) was formed to have a thickness of 107 nm after coating by controlling the rotation number of the gravure roll, and the resulting film was taken up. The refractive index of the high refractive index layer after curing was 1.905.

[Coating of Low Refractive Index Layer (LL-6)]

The triacetyl cellulose film having provided thereon up to High Refractive Index Layer (HL-1) was again unrolled, and Coating Solution (LLL-6) for Low Refractive Index Layer was coated thereon by using a doctor blade and a microgravure roll having a diameter of 50 mm and having a gravure pattern with a line number of 180 lines/inch and a depth of 40 μm under the conditions such that the transportation speed was 15 m/min, and after drying at 120° C. for 150 seconds, irradiated with an ultraviolet ray at an illumination intensity of 400 mW/$cm^2$ and an irradiation dose of 900 mJ/$cm^2$ to form Low Refractive Index Layer (LL-6) having a thickness of 85 nm. The resulting film was taken up. In this way, Antireflection Film Sample (120) was produced.

Example 1-22 to 1-25 and Comparative Examples 1-6 and 1-7

Antireflection Film Samples (127) to (132) were produced by changing the coating solution for high refractive index layer and the coating solution for low refractive index layer in Example 1-16 as shown in Table 1. Here, High Refractive Index Layer (HL-2) may be formed by changing Coating Solution (HLL-1) for High Refractive Index Layers of Examples 1-22 to (HLL-2), and Low Refractive Index Layer (LL-2), (LL-5), (LL-11) and (LL-15) may be formed by changing Coating Solution (LLL-6) for Low Refractive Index Layer of Example 1-22 to (LLL-2), (LLL-5), (LLL-11) and (LLL-15) respectively.

(1) Average Reflectance

The spectral reflectance of each antireflection film was measured at an incident angle of 5° in the wavelength region of 380 to 780 nm by using a spectrophotometer (manufactured by JASCO Corp.). The result was shown by the average reflectance of 450 to 650 nm.

TABLE 1

| | | | Antireflection Film | | | |
|---|---|---|---|---|---|---|
| Sample No. | Hard Coat Layer No. | Thickness of Hard Coat Layer (μ) | Medium Refractive Index Layer No. | High Refractive Index Layer No. | Low Refractive Index Layer No. | Refractive Index of Low Refractive Index Layer |
| Example 1-1 | 101 | HC-1 | 3.6 | — | — | LL-6 | 1.42 |
| Example 1-2 | 102 | HC-1 | 3.6 | — | — | LL-11 | 1.42 |
| Example 1-3 | 103 | HC-1 | 3.6 | — | — | LL-15 | 1.42 |
| Example 1-4 | 104 | HC-2 | 8.0 | — | — | LL-6 | 1.42 |
| Example 1-5 | 105 | HC-2 | 8.0 | — | — | LL-11 | 1.42 |
| Example 1-6 | 106 | HC-2 | 8.0 | — | — | LL-15 | 1.42 |
| Example 1-7 | 107 | HC-3 | 6.0 | — | — | LL-1 | 1.44 |
| Example 1-8 | 108 | HC-3 | 6.0 | — | — | LL-9 | 1.44 |
| Example 1-9 | 109 | HC-3 | 6.0 | — | — | LL-13 | 1.44 |
| Example 1-10 | 110 | HC-3 | 6.0 | — | — | LL-4 | 1.44 |
| Example 1-11 | 111 | HC-3 | 6.0 | — | — | LL-6 | 1.42 |
| Example 1-12 | 112 | HC-3 | 6.0 | — | — | LL-11 | 1.42 |
| Example 1-13 | 113 | HC-3 | 6.0 | — | — | LL-15 | 1.42 |
| Example 1-14 | 114 | HC-3 | 6.0 | — | — | LL-7 | 1.43 |
| Example 1-15 | 115 | HC-3 | 6.0 | — | — | LL-12 | 1.43 |
| Example 1-16 | 116 | HC-3 | 6.0 | — | — | LL-16 | 1.43 |
| Example 1-17 | 117 | HC-3 | 6.0 | — | — | LL-8 | 1.42 |
| Comparative Example 1-1 | 118 | HC-3 | 6.0 | — | — | LL-2 | 1.44 |
| Comparative Example 1-2 | 119 | HC-3 | 6.0 | — | — | LL-3 | 1.44 |
| Comparative Example 1-3 | 120 | HC-3 | 6.0 | — | — | LL-10 | 1.44 |
| Comparative Example 1-4 | 121 | HC-3 | 6.0 | — | — | LL-14 | 1.44 |
| Comparative Example 1-5 | 122 | HC-3 | 6.0 | — | — | LL-5 | 1.42 |
| Example 1-18 | 123 | HC-4 | 1.5 to 4.5 | — | — | LL-6 | 1.42 |
| Example 1-19 | 124 | HC-5 | 1.5 to 4.5 | — | — | LL-6 | 1.42 |
| Example 1-20 | 125 | HC-5 | 1.5 to 4.5 | — | — | LL-11 | 1.42 |
| Example 1-21 | 126 | HC-5 | 1.5 to 4.5 | — | — | LL-15 | 1.42 |
| Example 1-22 | 127 | HC-2 | 8.0 | ML-1 | HL-1 | LL-6 | 1.42 |
| Example 1-23 | 128 | HC-2 | 8.0 | ML-1 | HL-2 | LL-6 | 1.42 |
| Example 1-24 | 129 | HC-2 | 8.0 | ML-1 | HL-2 | LL-11 | 1.42 |
| Example 1-25 | 130 | HC-2 | 8.0 | ML-1 | HL-2 | LL-15 | 1.42 |
| Comparative Example 1-6 | 131 | HC-2 | 8.0 | ML-1 | HL-1 | LL-2 | 1.44 |
| Comparative Example 1-7 | 132 | HC-2 | 8.0 | ML-1 | HL-1 | LL-5 | 1.42 |

[Saponification Treatment of Antireflection Film]

After the production of antireflection film samples, these antireflection film samples each was subjected to the following treatment.

An aqueous 1.5 mol/liter sodium hydroxide solution was prepared and kept at 55° C. Separately, an aqueous 0.01 mol/liter dilute sulfuric acid solution was prepared and kept at 35° C. The produced antireflection film was dipped in the aqueous sodium hydroxide solution for 2 minutes and then dipped in water to thoroughly wash out the aqueous sodium hydroxide solution. Subsequently, the film was dipped in the aqueous dilute sulfuric acid solution for 1 minute and then dipped in water to thoroughly wash out the aqueous dilute sulfuric acid solution. Finally, the sample was thoroughly dried at 120° C.

[Evaluation of Antireflection Film]

The film samples obtained after the saponification treatment each was evaluated on the following items. As for the evaluation of the surface state, the surface state in a coated area of 10 m² out of the coated part was inspected with an eye, and the failure level was shown.

(2) Evaluation of Steel Wool (SW) Scratch Resistance

The antireflection film samples each was subjected to a rubbing test by using a rubbing tester under the following conditions.

Environmental conditions of evaluation: 25° C. and 60% RH
Rubbing material:

A steel wool {"Grade No. 0000", manufactured by Nippon Steel Wool K. K.} was wound around a rubbing tip (1 cm×1 cm) of a tester coming into contact with the sample and fixed by a band to resist movement.
Moving distance (one way): 13 cm
Rubbing speed: 13 cm/sec
Load: 500 g/cm²
Contact area of tip: 1 cm×1 cm
Number of rubbings: 10 reciprocations An oily black ink was painted on the back side of the rubbed sample, and the abrasion in the rubbed portion was observed with an eye by the reflected light and evaluated according to the following criteria.

⊚: Scratches were not observed at all even by very careful observation.

○: Faint scratches were observed by very careful observation.
○△: Faint scratches were observed.
△: Scratches of medium degree were observed.
△X-X: Scratches were observed at the first glance.

(3) Eraser Rubbing Durability

The antireflection film samples each was fixed on a glass surface with a pressure-sensitive adhesive, and an eraser "MONO" {produced by Tombo Pencil Co., Ltd.} cut out to a diameter of 8 mm and a thickness of 4 mm, which was used as the rubbing tester head, was pressed vertically on the surface of the antireflection film sample from above under a load of 500 g/cm² and moved back and force 200 times at 25° C. and 60 RH % under the conditions such that the stroke length was 3.5 cm and the rubbing rate was 1.8 cm/sec. After removing the attached eraser, the rubbed part of the sample was confirmed with an eye. This test was repeated 3 times, and the average of the degrees of surface scratching was evaluated on the following 4-stage scale.

○: Scratching was scarcely observed.
△: Scratching was slightly observed.
X: Scratching was clearly observed.
X X: Scratching was observed over the entire rubbed portion.

(4) Marker Wipability

The antireflection film samples each was fixed on a glass surface with a pressure-sensitive adhesive, and a circle having a diameter of 5 mm was written thereon in three turns with a pen tip (fine) of a black marker, "Macky Gokuboso" (trade name, produced by ZEBRA Co.), under the conditions of 25° C. and 60% RH and after 5 seconds, wiped off with a 10-ply folded and bundled Bencot (trade name, produced by Asahi Kasei Corp.) by reciprocating the bundle 20 times under a load enough to put a dent on the Bencot bundle. The writing and wiping were repeated under the above-described conditions until the marker stain could not be eliminated by the wiping. The number of repetitions where the mark could be wiped off was determined. This test was repeated four times and the average of these tests was rated on the following 4-stage scale.

○: Could be wiped off 10 times or more.
△: Could be wiped off from several times to less than 10 times.
X: Could be wiped off once.
X X: Could not be wiped off even once.

TABLE 2

| | Sample No. | Curing | Reflectance (%) | SW Rubbing Resistance | Eraser Rubbing Durability | Marker Ink Wipability |
|---|---|---|---|---|---|---|
| Example 1-1 | 101 | ○ | 1.6 | ⊚ | ⊚ | ○ |
| Example 1-2 | 102 | ○ | 1.7 | ⊚ | ○ | ○ |
| Example 1-3 | 103 | ○ | 1.6 | ⊚ | ⊚ | ○ |
| Example 1-4 | 104 | ○ | 1.2 | ⊚ | ⊚ | ○ |
| Example 1-5 | 105 | ○ | 1.3 | ⊚ | ○ | ○ |
| Example 1-6 | 106 | ○ | 1.2 | ⊚ | ⊚ | ○ |
| Example 1-7 | 107 | ○ | 2.0 | ○ | ○ | ○ |
| Example 1-8 | 108 | ○ | 2.0 | ○ | ○ | ○ |
| Example 1-9 | 109 | ○ | 1.9 | ⊚ | ⊚ | ○ |
| Example 1-10 | 110 | ○ | 2.0 | ⊚ | ⊚ | ○ |
| Example 1-11 | 111 | ○ | 1.9 | ⊚ | ⊚ | ○ |
| Example 1-12 | 112 | ○ | 1.9 | ⊚ | ○ | ○ |
| Example 1-13 | 113 | ○ | 1.8 | ⊚ | ⊚ | ○ |
| Example 1-14 | 114 | ○ | 1.9 | ⊚ | ⊚ | ○ |
| Example 1-15 | 115 | ○ | 1.9 | ⊚ | ○ | ○ |
| Example 1-16 | 116 | ○ | 1.8 | ⊚ | ⊚ | ○ |
| Example 1-17 | 117 | ○ | 1.9 | ⊚ | ⊚ | ○ |
| Comparative Example 1-1 | 118 | ○ | 2.0 | △ | X | X |
| Comparative Example 1-2 | 119 | ○ | 2.0 | △ | X | ○ |
| Comparative Example 1-3 | 120 | ○ | 2.0 | △ | X | ○ |
| Comparative Example 1-4 | 121 | ○ | 1.9 | △ | X | ○ |
| Comparative Example 1-5 | 122 | X | — | — | — | — |
| Example 1-18 | 123 | ○ | 2.1 | ○ | ○ | ○ |
| Example 1-19 | 124 | ○ | 2.1 | ⊚ | ⊚ | ○ |
| Example 1-20 | 125 | ○ | 2.1 | ⊚ | ○ | ○ |
| Example 1-21 | 126 | ○ | 2.0 | ⊚ | ⊚ | ○ |
| Example 1-22 | 127 | ○ | 0.35 | ○ | ○ | ○ |
| Example 1-23 | 128 | ○ | 0.35 | ⊚ | ⊚ | ○ |
| Example 1-24 | 129 | ○ | 0.37 | ⊚ | ○ | ○ |
| Example 1-25 | 130 | ○ | 0.34 | ⊚ | ⊚ | ○ |
| Comparative Example 1-6 | 131 | ○ | 0.37 | △ | X | ○ |
| Comparative Example 1-7 | 132 | X | — | — | — | — |

* As for the curing in the Table, the surface of the antireflection film after curing was touched with a hand wearing a rubber glove and rated X when sticky and ○ when not sticky.

The results shown in Table 2 reveal the followings.

In samples of the present invention where the low refractive index layer is formed of a cationic polymerizable composition, satisfactory curing is obtained even when the ultraviolet irradiation is performed at the atmospheric pressure without nitrogen purging (comparison of Samples 122 and 132 with all other samples, particularly, comparison between Sample 122 and Sample 111 and between Sample 132 and Sample 127).

When the organosilane compound of the present invention is introduced into a layer adjacent to the low refractive index layer, the scratch resistance by steel wool rubbing of the antireflection film can be improved (comparison between Sample 123 and Sample 124 and between Sample 127 and Sample 128).

<Production of Polarizing Plate>

Examples 11-1 and 11-2

Antireflection Film Samples 111 and 128 of the present invention produced in Example 1 each was dipped in an aqueous 1.5 mol/liter NaOH solution at 55° C. for 2 minutes, then neutralized, washed with water and laminated with a polarizing plate produced by adsorbing iodine to polyvinyl alcohol to produce a polarizer, stretching it and protecting both surfaces thereof with a 80 μm-thick triacetyl cellulose film (TAC-TD80U, produced by Fuji Photo Film Co., Ltd.). In this way, each polarizing plate with antireflection film was produced. Using the obtained polarizing plate, a liquid crystal display device was produced by disposing the antireflection layer as the outermost surface layer, as a result, the refractive index was low, the outside light was less projected, the reflected image was indistinct, the visibility was excellent, and the antifouling property which is important in the actual use mode was also excellent.

Examples 21-1 and 21-2

A polarizing plate was produced by adsorbing iodine to polyvinyl alcohol to produce a polarizing film, stretching the film, and protecting both surfaces thereof by bonding thereto a 80 μm-thick triacetyl cellulose film "TAC-TD80U" {produced by Fuji Photo Film Co., Ltd.} which was dipped in an aqueous NaOH solution with a concentration of 1.5 mol/liter at 55° C. for 2 minutes, then neutralized and washed with water, and Antireflection Film Sample 112 or 130 of Example 1. The thus-obtained polarizing plate was laminated by disposing the antireflection film side on the outermost surface to replace the polarizing plate on the viewing side of a liquid crystal display device {having "D-BEF" produced by Sumitomo 3M Ltd., which is a polarizing separation film with a polarization selection layer, between the backlight and the liquid crystal cell} of a note-type personal computer having mounted thereon a transmissive TN liquid crystal display device. As a result, in either case, a display device assured of low refractive index, extremely reduced projection of surrounding scenes, very high display quality and excellent antifouling property, was obtained.

<Liquid Crystal Display Device>

Examples 31-1 and 31-2

Antireflection film Sample 111 or 128 of the present invention produced in Example 1 was used as the viewing-side protective film of two protective films sandwiching the polarizer of the viewing-side polarizing plate of a transmissive TN liquid crystal cell. Further, each of a protective film, facing the liquid crystal cell, of a polarizing plate on the viewing side; and a protective film, facing the liquid crystal cell, of a polarizing plate on the backlight side is replaced with a viewing angle enlarging film "Wide View Film SA12B" {produced by Fuji Photo Film Co., Ltd.} in which an optical compensation layer is formed on a transparent support. "Wide View Film SA12B" is used so that its support surface is attached to the polarizer. As a result, in either case, a liquid crystal display device assured of low refractive index, extremely reduced projection of surrounding scenes, excellent contrast in a bright room, very wide viewing angle in the up, down, right and left directions, remarkably superior visibility, high display quality and excellent antifouling property, was obtained.

Example 41-1

Antireflection Film Sample 111 of the present invention produced in Example 1 was laminated to a glass plate on the surface of an organic EL display device through a pressure-sensitive adhesive, as a result, a display device reduced in the reflection on the glass surface, assured of high visibility and satisfactorily resistant against fouling in the maker wipability test, was obtained.

Example 51-1

A polarizing plate having an antireflection film on one surface was produced by using Antireflection Film Sample 128 of the present invention produced in Example 1, a λ/4 plate was laminated to the polarizing plate surface opposite the side having the antireflection film, and the resulting polarizing plate was laminated to a glass plate on the surface of an organic EL display device by disposing the antireflection film side as the outermost surface. As a result, a display device assured of excellent antifouling property, low refractive index and remarkably high visibility, with the surface reflection and reflection from the inside of the surface glass being cut, was obtained.

The antireflection film of the present invention has high antireflectivity and is assured of suitability for mass production and excellent scratch resistance.

Also, the polarizing plate of the present invention using the antireflection film as a surface protective film is a polarizing plate excellent in the optical performance and physical strength and can be provided by mass production at a low cost.

Furthermore, the image display device of the present invention comprises the above-described antireflection film or polarizing plate having excellent properties and is assured of high antireflectivity, excellent scratch resistance and good visibility.

The entire disclosure of each and every foreign patent application from which the benefit of foreign priority has been claimed in the present application is incorporated herein by reference, as if fully set forth.

What is claimed is:
1. An antireflection film comprising: a transparent plastic film substrate; a hard coat layer; and a low refractive index layer, in this order,
   wherein the low refractive index layer is formed by a curable composition comprising:
   (a) an inorganic fine particle;
   (b) at least one of: a cationic polymerizable compound having a silyl group within the molecule; a hydrolysate of the cationic polymerizable compound having a silyl group within the molecule; and a partial condensate of the cationic polymerizable compound having a silyl group within the molecule;

(c) a photo-cationic polymerization initiator;

wherein an amount of at least one compound having a cationic polymerizable group is 70 mass % or more, based on binder components of the curable composition, wherein the at least one compound having a cationic polymerizable group comprises said at least one of the cationic polymerizable compound having a silyl group within the molecule, the hydrolysate of the cationic polymerizable compound having a silyl group within the molecule, and the partial condensate of the cationic polymerizable compound having a silyl group within the molecule;

wherein the cationic polymerizable compound having a silyl group within the molecule is an organosilane represented by formula [A]:

$(R^1)_m Si(R^2)(X^{10})_{3-m}$ wherein $R^1$ represents a substituted or unsubstituted alkyl group or a substituted or unsubstituted aryl group, $R^2$ represents a monovalent substituent having a cationic polymerizable functional group, $X^{10}$ represents a hydroxyl group or a hydrolyzable group, and m represents an integer of 0 to 2.

2. The antireflection film as claimed in claim 1, wherein the inorganic fine particle (a) is a silica fine particle.

3. The antireflection film as claimed in claim 2, wherein at least one of a porous silica and a hollow silica occupies 50 mass % or more of all silica fine particles contained in the curable composition for forming the low refractive index layer.

4. The antireflection film as claimed in claim 2, wherein 50 mass % or more of silica fine particles contained in the curable composition for forming the low refractive index layer have an average particle diameter of 40 nm or more.

5. The antireflection film as claimed in claim 1, wherein the curable composition for forming the low refractive index layer further comprises (d) a polysiloxane compound having a cationic polymerizable functional group.

6. The antireflection film as claimed in claim 1, wherein the curable composition for forming the low refractive index layer further comprises (e) a fluorine compound represented by formula [B]:

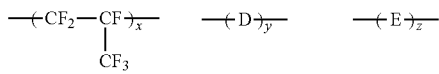

wherein x, y and z each represents a molar ratio, D represents a polymerization unit of a vinyl monomer having a cationic polymerizable group, and E represents a polymerization unit of an arbitrary vinyl monomer.

7. The antireflection film as claimed in claim 1, wherein the curable composition for forming the low refractive index layer further comprises (f) a compound containing neither a fluorine atom nor a silicon atom within the molecule and containing two or more cationic polymerizable groups.

8. The antireflection film as claimed in claim 1, wherein the refractive index of the low refractive index layer is from 1.35 to 1.45.

9. The antireflection film as claimed in claim 1, wherein the low refractive index layer is formed directly on the hard coat layer, and the hard coat layer is a cured film formed by a curable composition comprising at least one of an organosilane represented by formula [C], a hydrolysate of the organosilane represented by formula [C], and a partial condensate of the organosilane represented by formula [C]; wherein formula [C] represents:

$(R^{10})_n Si(X^{11})_{4-n}$ wherein $R^{10}$ represents a substituted or unsubstituted alkyl group or a substituted or unsubstituted aryl group, $X^{11}$ represents a hydroxyl group or a hydrolyzable group, and n represents an integer of 0 to 3.

10. The antireflection film as claimed in claim 1, wherein the low refractive index layer is formed directly on the hard coat layer, and the hard coat layer is a cured film formed by a curable composition containing a compound having a cationic polymerizable group.

11. The antireflection film as claimed in claim 1, wherein the low refractive index layer is cured by ultraviolet irradiation under a condition such that oxygen concentration is 1 vol% or more.

12. The antireflection film as claimed in claim 1, which has irregularities on its surface and has an antiglare property.

13. A polarizing plate comprising:
a polarizing film; and
protective films for the polarizing film,
wherein at least one of the protective films is the antireflection film claimed in claim 1.

14. An image display device which has an image display surface, the device comprising
the polarizing plate claimed in claim 13 on the image display surface.

15. A polarizing plate comprising:
a polarizing film; and
protective films for the polarizing film,
wherein one of the protective films is the antireflection film claimed in claim 1, and the other one of the protective films is an optical compensation film having an optically anisotropic property.

16. An image display device which has an image display surface, the device comprising
the antireflection film claimed in claim 1 on the image display surface.

17. The image display device as claimed in claim 16, which is a TN-mode, STN-mode, IPS-mode, VA-mode or OCB-mode transmissive, reflective or transflective liquid crystal display device.

18. The antireflection film as claimed in claim 1, wherein the low refractive index layer is in direct contact with the hard coat layer, and the hard coat layer is formed from a curable composition comprising a compound having a cationic polymerizable group.

19. The antireflection film as claimed in claim 1, wherein an amount of at least one compound having a cationic polymerizable group contained in a curable composition for forming the hard coat layer, is 5 mass % or more, based on all binders contained in the curable composition.

20. The antireflection film as claimed in claim 1, wherein a curable composition for forming the hard coat layer comprises a monomer having two or more ethylenically unsaturated groups and a compound having a cationic polymerizable group.

21. The antireflection film as claimed in claim 1, wherein a curable composition for forming the hard coat layer comprises diaryl iodonium salt as a photo-cationic polymerization initiator.

22. The antireflection film as claimed in claim 1, wherein the photo-cationic polymerization initiator is triarylsulfonium salt, diaryliodonium salt or an active halogen.

23. The antireflection film as claimed in claim 1, wherein the photo-cationic polymerization initiator is an active halogen.

24. The antireflection film as claimed in claim 1, wherein the photo-cationic polymerization initiator is an s-triazine compound.

* * * * *